(12) United States Patent
Peng et al.

(10) Patent No.: US 10,142,654 B2
(45) Date of Patent: Nov. 27, 2018

(54) METHOD FOR ENCODING/DECODING VIDEO BY OBLONG INTRA PREDICTION

(71) Applicant: National Chiao Tung University, Hsinchu (TW)

(72) Inventors: Wen-Hsiao Peng, Hsinchu County (TW); Hsueh-Ming Hang, Hsinchu (TW); Chun-Chi Chen, Tainan (TW); Ru-Ling Liao, Taichung (TW)

(73) Assignee: National Chiao Tung University, Hsinchu (TW)

( * ) Notice: Subject to any disclaimer, the term of this patent is extended or adjusted under 35 U.S.C. 154(b) by 838 days.

(21) Appl. No.: 14/583,590

(22) Filed: Dec. 27, 2014

(65) Prior Publication Data

US 2015/0189272 A1 Jul. 2, 2015

Related U.S. Application Data

(60) Provisional application No. 61/921,091, filed on Dec. 27, 2013.

(51) Int. Cl.
*H04N 19/593* (2014.01)
*H04N 19/119* (2014.01)
*H04N 19/154* (2014.01)
*H04N 19/105* (2014.01)
*H04N 19/176* (2014.01)
*H04N 19/11* (2014.01)
*H04N 19/115* (2014.01)

(52) U.S. Cl.
CPC ......... *H04N 19/593* (2014.11); *H04N 19/105* (2014.11); *H04N 19/119* (2014.11); *H04N 19/154* (2014.11); *H04N 19/176* (2014.11); *H04N 19/11* (2014.11); *H04N 19/115* (2014.11)

(58) Field of Classification Search
None
See application file for complete search history.

(56) References Cited

U.S. PATENT DOCUMENTS

| 2003/0202588 | A1 | 10/2003 | Yu et al. |
| 2011/0134998 | A1 | 6/2011 | Lee et al. |
| 2011/0150087 | A1* | 6/2011 | Kim ................ H04N 19/176 375/240.12 |

(Continued)

FOREIGN PATENT DOCUMENTS

| CN | 102369733 | | 3/2012 | |
| WO | WO 2015031806 A1 * | | 3/2015 | ........... H04N 19/174 |

OTHER PUBLICATIONS

USPTO, Final Rejection for U.S. Appl. No. 14/583,111 (dated Jul. 7, 2017).*

(Continued)

*Primary Examiner* — David N Werner
(74) *Attorney, Agent, or Firm* — JCIPRNET

(57) ABSTRACT

A video encoding method is provided in the invention. In such method, after a current encoding frame among a sequence of input frames is received, each coding unit in the current encoding frame may be optionally split into two oblong prediction units, and each of the prediction units may be optionally split into a plurality of sub-blocks so as to thereby improve the matching accuracy for a matching reference block from a reference frame. A video decoding method corresponding to the aforesaid video encoding method is also provided.

7 Claims, 16 Drawing Sheets

(56) References Cited

U.S. PATENT DOCUMENTS

| | | | |
|---|---|---|---|
| 2013/0039415 A1 | 2/2013 | Kim et al. | |
| 2013/0163664 A1* | 6/2013 | Guo | H04N 19/00793 375/240.12 |
| 2013/0294517 A1* | 11/2013 | Fujibayashi | H04N 19/52 375/240.16 |
| 2014/0314143 A1* | 10/2014 | Lee | H04N 19/139 375/240.02 |
| 2015/0189269 A1* | 7/2015 | Han | H04N 19/176 375/240.12 |
| 2016/0277733 A1* | 9/2016 | Li | H04N 19/593 |

OTHER PUBLICATIONS

Suzuki et al., "Video encoding scheme employing intra and inter prediction based on averaged template matching predictors," IEICE Transactions on Information and Systems, Apr. 2008, pp. 1127-1134.

Budagavi et al., "Intra motion compensation and entropy coding improvements for HEVC screen content coding," Picture Coding Symposium (PCS), Dec. 8-11, 2013, pp. 365-368.

Chen et al., "AHG8: Line-based Intra Block Copy," Joint Collaborative Team on Video Coding ITU-T SG16 WP3 and ISO/IEC JTC1/SC29/WG11, Oct. 2013, pp. 1-10.

Chang et al., "RCE3: Results of Subtest B.1 on Nx2N/2NxN Intra Block Copy," Joint Collaborative Team on Video Coding ITU-T SG 16 WP 3 and ISO/IEC JTC 1/SC 29/WG 11, Jan. 2014, pp. 1-6.

Chang et al., "RCE3: Results of Subtest D.2 on Nx2N/2NxN/NxN Intra Block Copy," Joint Collaborative Team on Video Coding ITU-T SG 16 WP 3 and ISO/IEC JTC 1/SC 29/WG 11, Jan. 2014, pp. 1-4.

Chen et al., "Description of Screen Content Coding Technology Proposal by NCTU and ITRI," Joint Collaborative Team on Video Coding ITU-T SG16 WP3 and ISO/IEC JTC1/SC29/WG11, Mar. 2014, pp. 1-11.

Chen et al., "Non-SCCE2: Line-based Intra Copy with Unconstrained 2-D BV Coding for Test C," Joint Collaborative Team on Video Coding ITU-T SG16 WP3 and ISO/IEC JTC1/SC29/WG11, Jun. 2014, pp. 1-7.

Chang et al., "SCCE2: Line-based Intra Copy with 2-D BV and PU-level Splitting (Test B), and Its Variants with Constrained PU-level Splitting (Test C) and BV Merging (Test D)," Joint Collaborative Team on Video Coding ITU-T SG16 WP3 and ISO/IEC JTC1/SC29/WG11, Jun. 2014, pp. 1-10.

Chen et al., "Screen Content Coding using Non-square Intra Block Copy for HEVC," 2014 IEEE International Conference on Multimedia and Expo (ICME), Jul. 14-18, 2014, pp. 1-6.

Liao et al., "CE4: Results of Test A on Search Range of Intra Line Copy," Joint Collaborative Team on Video Coding ITU-T SG16 WP3 and ISO/IEC JTC1/SC29/WG11, Oct. 2014, pp. 1-10.

Liao et al., "Non-CE4: On CABAC Throughput of Intra Line Copy," Joint Collaborative Team on Video Coding ITU-T SG16 WP3 and ISO/IEC JTC1/SC29/WG11, Oct. 2014, pp. 1-9.

Liao et al., "Non-CE4: Intra Line Copy with Extended Full-frame Search for Test A," Joint Collaborative Team on Video Coding ITU-T SG16 WP3 and ISO/IEC JTC1/SC29/WG11, Oct. 2014, pp. 1-8.

Chang et al., "Intra Line Copy for HEVC Screen Content Coding," Asia-Pacific Signal and Information Processing Association Annual Summit and Conference, Dec. 12, 2014, pp. 1-8.

\* cited by examiner

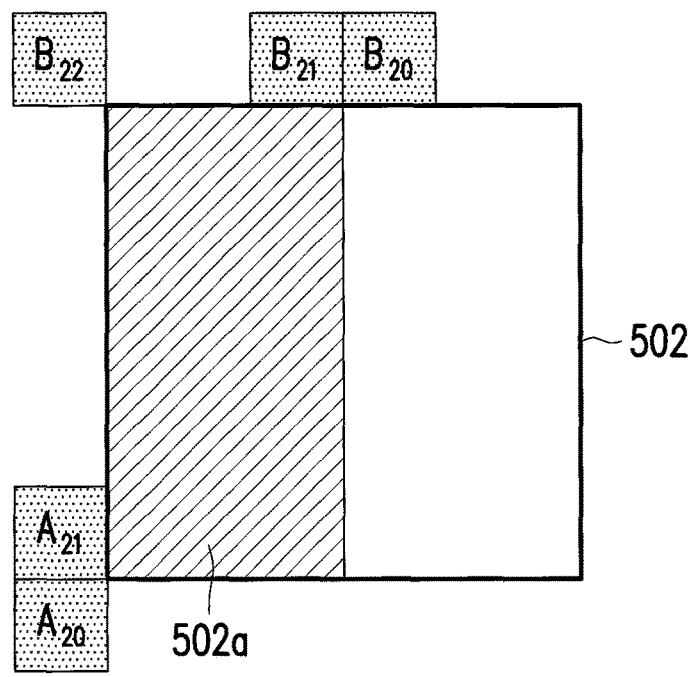
FIG. 5B1
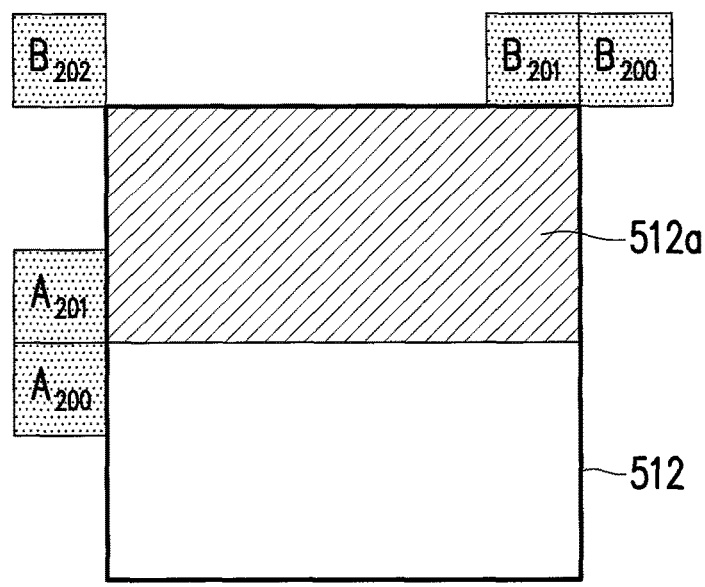
FIG. 5B2

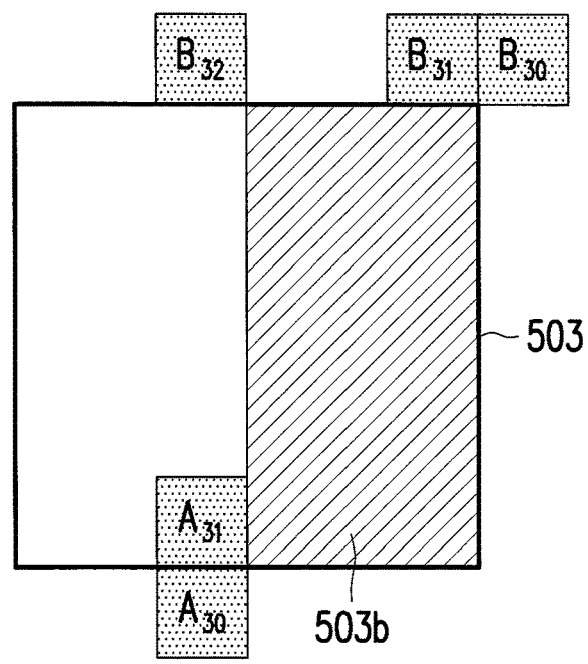
FIG. 5C1
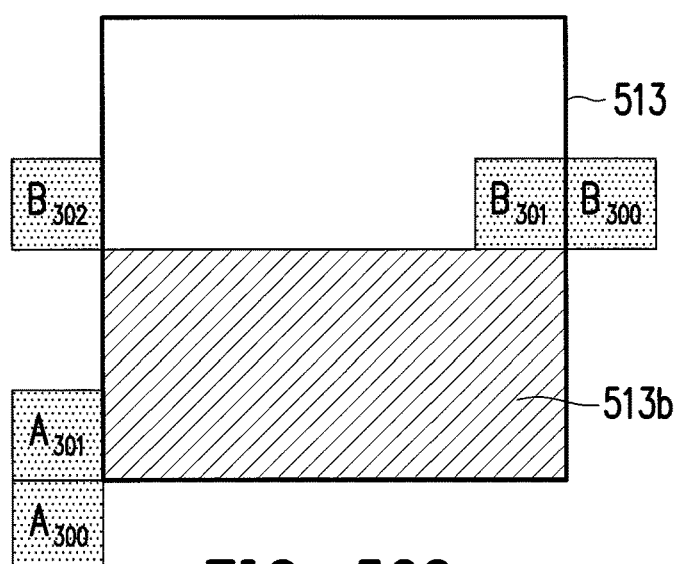
FIG. 5C2

METHOD FOR ENCODING/DECODING VIDEO BY OBLONG INTRA PREDICTION

CROSS-REFERENCE TO RELATED APPLICATION

This application claims the priority benefits of U.S. provisional application Ser. No. 61/921,091, filed on Dec. 27, 2013. The entirety of the above-mentioned patent application is hereby incorporated by reference herein and made a part of this specification.

BACKGROUND OF THE INVENTION

1. Field of the Invention

The invention generally relates to a method for video processing, in particular, to a method for encoding and decoding video by oblong intra prediction.

2. Description of Related Art

The development of digital multimedia technology has provided high quality video streaming. Given limited storage capacity and network bandwidth for image data transmission and reception, video compression technology thus plays an important and indispensable role. High Efficiency Video Coding (HEVC/H.265) is one of the existing video compression standards and was jointly developed by Video Coding Expert Group (VCEG) and Moving Picture Experts Group (MPEG). Compared with Advanced Video Coding (AVC/H.264), HEVC/H.265 not only provides higher compression ratio and video quality, but also supports ultra high definition (UHD) image resolution.

The H.265/HEVC video encoding mechanism is to first partition an encoding frame into a plurality of equally-sized square coding tree units (CTU), where the size of each of the coding tree units may be 64×64, 32×32, or 16×16 (in pixel). Next, each of the coding tree units may be partitioned into one or more coding units (CU) in a quadtree representation, where each of the coding units is a square having a same size as or a smaller size than one coding tree unit. The size of each of the coding units may be 64×64, 32×32, 16×16, or 8×8, and may be represented as 2N×2N. Each pixel within a same coding unit is encoded by employing a same encoding mode, and each of the coding units is further partitioned into one, two, or four prediction units (PU) according to the corresponding encoding mode. The partition technique involves an intra prediction mode, an inter prediction mode, and an intra block copy mode, where each pixel within the same prediction unit is encoded by employing a same prediction mode.

The prediction approach used in the intra prediction mode is to reconstruct neighboring image samples for a next prediction, and it supports a 2N×2N and an N×N partition. The prediction approach used in the inter prediction mode uses motion compensation for a next prediction, and it supports a symmetric partition mode (e.g. 2N×2N, N×2N, 2N×N, and N×N) as well as an asymmetric partition mode (e.g. 2N×nU, 2N×nD, nL×2N, and nR×2N), where nU, nD, nL, and nR respectively belong to shorter sides of different blocks after the partition. The intra block copy mode is an exception of the intra prediction mode, where a neighboring block is copied to sub-blocks in a current coding unit to reduce data transmission. Such mode only supports a 2N×2N partition.

A matching reference block for each of the prediction units in a coding unit would be searched from a reference frame, and a residual between each of the prediction units and its reference block would be calculated for residual encoding. In terms of the residual encoding, each of the coding units would be partitioned into one or more square transform units (TU) in quadtree representation. Cross component prediction (CCP), residual differential pulse coding modulation (RDPCM), discrete cosine transform (DCT), and quantization would be performed on each of the transform units, and the residual encoding is then completed. Lastly, each of the coding units would be reconstructed according to its encoding mode.

Even though the H.265/HEVC video compression standard provides high compression ratio, only a square prediction unit is allowed for intra prediction and intra block copy. It is not simple to search out a matching reference block and thereby adversely affect video encoding efficiency.

SUMMARY OF THE INVENTION

Accordingly, the invention is directed to a video encoding method and a video decoding method which effectively enhance the efficiency for video encoding.

The invention is directed to a video encoding method, adapted to a video encoder, includes the following steps: receiving a current encoding frame among a sequence of input frames; partitioning a current coding unit in a current coding tree unit in the current encoding frame into two oblong prediction units according to a prediction unit partition mode, where each of the prediction units respectively corresponds to a reference frame among the sequence of input frames, where at least one of the reference frames is the current encoding frame, where the prediction units include a current prediction unit, and where the size of the current coding unit is 2N×2N; searching for an optimal reference block corresponding to the current prediction unit within a search range in the reference frame corresponding to the current prediction unit, and obtaining an optimal block vector between the current prediction unit and the optimal reference block, where the optimal block vector is a relative position between the current prediction unit and the optimal reference block; and encoding the current prediction unit according to the prediction unit partition mode and information associated with the optimal block vector.

The invention is directed to a video decoding method, adapted to a video decoder, includes the following steps: receiving a current decoding frame among a sequence of encoded frames, a prediction unit partition mode, and information associated with an optimal block vector; partitioning a current coding unit in a current coding tree unit in the current decoding frame into two oblong prediction units according to the prediction unit partition mode, where each of the prediction units respectively corresponds to a reference frame among the sequence of reconstruction frames, where at least one of the reference frames is the current decoding frame, where the prediction units includes a current prediction unit, and where the size of the current coding unit is 2N×2N; and decoding the current prediction unit according to the information associated with the optimal block vector, where the optimal block vector is a relative position between the current prediction unit and the optimal reference block.

According to an embodiment of the invention, the prediction unit partition mode is a horizontal partition, and the size of each of the prediction units is 2N×N.

According to an embodiment of the invention, the prediction unit partition mode is a horizontal partition, and the size of each of the prediction units is respectively 2N×M and 2N×(2N−M), where M is an exponent of 2, and where M is 1, 2, 4, . . . , or 2N, and M≠N.

According to an embodiment of the invention, the prediction unit partition mode is a vertical partition, and the size of each of the prediction units is N×2N.

According to an embodiment of the invention, the prediction unit partition mode is a vertical partition, and the size of each of the prediction units is respectively M×2N and (2N−M)×2N, where M is an exponent of 2, and where M is 1, 2, 4, . . . , or 2N, and M≠N.

The invention is directed to another video encoding method, adapted to a video encoder, includes the following steps: receiving a current encoding frame among a sequence of input frames; partitioning a current prediction unit in a current coding unit in a current coding tree unit in the current encoding frame into a plurality of sub-blocks according to a sub-block partition mode, where the sub-blocks includes a current sub-block, where each of the sub-blocks respectively corresponds to a reference frame among the sequence of input frames, where at least one of the reference frames is the current encoding frame, and where the size of the current prediction unit is set to one of 2N×2N, 2N×N, 2N×M, 2N×(2N−M), N×2N, M×2N, or (2N−M)×2N according to a prediction unit partition mode, where M is an exponent of 2, M is 1, 2, 4, . . . , or 2N, and M≠N; searching for an optimal reference sub-block of the current sub-block within a search range in the reference frame corresponding to the current sub-block, and obtaining an optimal sub-block vector between the current sub-block and the optimal reference sub-block, where the optimal block vector is a relative position between the current sub-block and the optimal reference block; and encoding the current sub-block according to the prediction unit partition mode, the sub-block partition mode, and information associated with the optimal sub-block vector.

The invention is directed to a video decoding method, adapted to a video decoder, includes the following steps: receiving a current decoding frame among a sequence of encoded frames, a prediction unit partition mode, a sub-block partition mode, and information associated with an optimal sub-block vector; partitioning a current prediction unit in a current coding unit in a current coding tree unit in the current decoding frame into a plurality of sub-blocks according to the sub-block partition mode, where each of the sub-block respectively corresponds to a reference frame among the sequence of reconstruction frames, where the size of the current prediction unit is set to one of 2N×2N, 2N×N, 2N×M, 2N×(2N−M), N×2N, M×2N, or (2N−M)×2N according to the prediction unit partition mode, where M is an exponent of 2, and where M is 1, 2, 4, . . . , or 2N, and M≠N; and decoding the current sub-block according to the information associated with the optimal sub-block vector, where the optimal sub-block vector is a relative position between the current sub-block and the optimal reference sub-block.

According to an embodiment of the invention, the sub-block partition mode is a horizontal partition, and the width of each of the sub-blocks is equal to that of the current prediction unit. When one of the width or the height of the sub-blocks is equal to 1, the reference frame corresponding to the current prediction unit is the current encoding frame. When the height of each of the sub-blocks is 1, the size of each of the sub-blocks is one of the followings: when the size of the current prediction unit is 2N×2N, 2N×N, 2N×M, or 2N×(2N−M), the size of each of the sub-blocks is 2N×1; when the size of the current prediction unit is N×2N, the size of each of the sub-blocks is N×1; when the size of the current prediction unit is M×2N, the size of each of the sub-blocks is M×1; and when the size of the current prediction unit is (2N−M)×2N, the size of each of the sub-blocks is (2N−M)×1. When the height of each of the sub-blocks is L, the size of each of the sub-blocks is one of the followings: when the size of the current prediction unit is 2N×2N, the size of each of the sub-blocks is 2N×L, where 1<L≤2N; when the size of the current prediction unit is 2N×N, the size of each of the sub-blocks is 2N×L, where 1<L≤N; when the size of the current prediction unit is 2N×M, the size of each of the sub-blocks is 2N×L, where 1<L≤M; when the size of the current prediction unit is 2N×(2N−M), the size of each of the sub-blocks is 2N×L, where 1<L≤2N−M; when the size of the current prediction unit is N×2N, the size of each of the sub-blocks is N×L, where 1<L≤2N; when the size of the current prediction unit is M×2N, the size of each of the sub-blocks is M×L, where 1<L≤2N; and when the size of the current prediction unit is (2N−M)×2N, the size of each of the sub-blocks is (2N−M)×L, where 1<L≤2N. In these cases, L is an exponent of 2.

According to an embodiment of the invention, the sub-block partition mode is a vertical partition, and the height of each of the sub-blocks is equal to that of the current prediction unit. When one of the width or the height of the sub-blocks is equal to 1, the reference frame corresponding to the current prediction unit is the current encoding frame. When the width of each of the sub-blocks is 1, the size of each of the sub-blocks is one of the followings: when the size of the current prediction unit is 2N×2N, N×2N, M×2N, or (2N−M)×2N, the size of each of the sub-blocks is 1×2N; when the size of the current prediction unit is 2N×N, the size of each of the sub-blocks is 1×N; when the size of the current prediction unit is 2N×M, the size of each of the sub-blocks is 1×M; and when the size of the current prediction unit is 2N×(2N−M), the size of each of the sub-blocks is 1×(2N−M). When the width of each of the sub-blocks is L, the size of each of the sub-blocks is one of the followings: when the size of the current prediction unit is 2N×2N, the size of each of the sub-blocks is L×2N, where 1<L 2N; when the size of the current prediction unit is 2N×N, the size of each of the sub-blocks is L×N, where 1<L≤2N; when the size of the current prediction unit is 2N×M, the size of each of the sub-blocks is L×M, where 1<L<2N; when the size of the current prediction unit is 2N×(2N−M), the size of each of the sub-blocks is L×(2N−M), where 1<L≤2N; when the size of the current prediction unit is N×2N, the size of each of the sub-blocks is L×2N, where 1<L≤N; when the size of the current prediction unit is M×2N, the size of each of the sub-blocks is L×2N, where 1<L and when the size of the current prediction unit is (2N−M)×2N, the size of each of the sub-blocks is L×2N, where 1<L≤(2N−M). In these cases, L is an exponent of 2.

In summary, the video encoding method and the video decoding method proposed in the invention may adaptively partition a coding unit into two oblong prediction units, and may further partition a prediction unit into a plurality of sub-blocks so as to thereby improve the accuracy for searching out a matching reference block of a prediction unit or a sub-block from a reference frame and enhance video encoding efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A-FIG. 5C2 illustrate three examples of the block vector prediction in inter prediction according to an embodiment of the invention.

DESCRIPTION OF THE EMBODIMENTS

Figure 1:
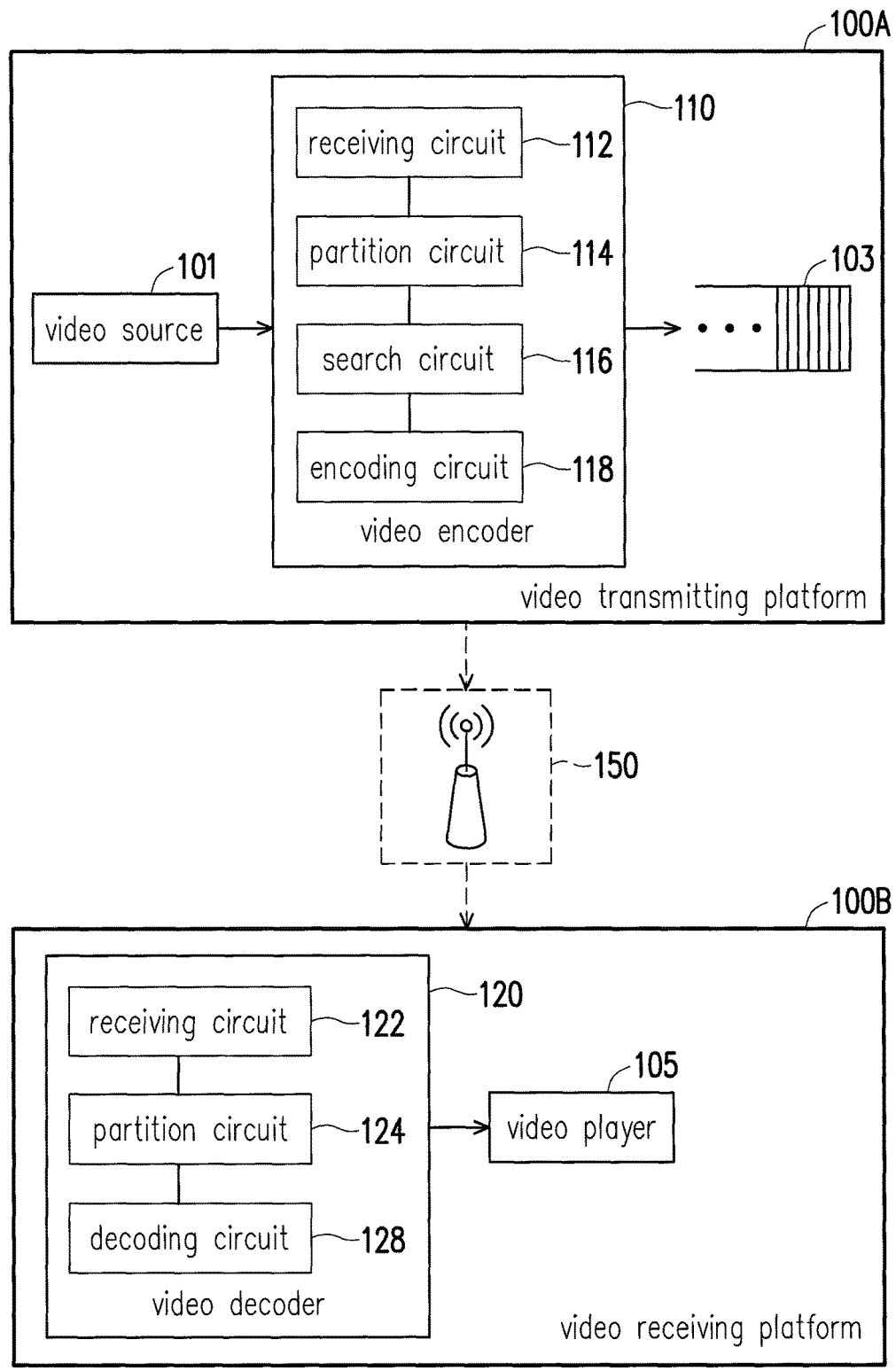
FIG. 1 illustrates a block diagram of a system architecture which utilizes a proposed video encoding method according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts. Specific structural and functional detail disclosed herein are not to be interpreted as limiting, but merely as a representative basis for teaching one skilled in the art to variously employ the present invention.

FIG. 1 illustrates a block diagram of a system architecture which utilizes a proposed video encoding method according to an embodiment of the invention. However, this is merely as a representative basis, and should not to be interpreted as limiting the invention.

Referring to FIG. 1, a system 100 illustrated in FIG. 1 includes a video transmitting platform 100A and a video receiving platform 100B. The video transmitting platform 100A includes a video source 101 which is an apparatus for providing video streams or motion pictures. The video source 101 would output raw data of the video streams or the motion pictures to a video encoder 110, and the video encoder 110 would output encoded videos to an encoding buffer 103. The video transmitting platform 100A would then output the encoded videos to the video receiving platform 100B via a network 150 by going through a connection such as Wi-Fi, 2G, 3G, 4G, ADSL, and optical fibre services. The video receiving platform 100B includes a video decoder 120 which decodes the encoded videos received from the video transmitting platform 100A and then transfers the decoded video to a video player 105 for video playing.

The video encoder 110 includes a receiving circuit 112, a partition circuit 114, a search circuit 116, and an encoding circuit 118, where the partition circuit 114 is coupled to the receiving circuit 112, the searching circuit 116 is coupled to the partition circuit 114, and the encoding circuit 118 is coupled to the search circuit 116. The video decoder 120 includes a receiving circuit 122, a partition circuit 124, and a decoding circuit 128, where the partition circuit 124 is coupled to the receiving circuit 122, the encoding circuit 128 is coupled to the partition circuit 124. Each circuit in the video encoder 110 and video decoder 120 may be implemented as one or more integrated circuits, where each of the integrated circuits may include a plurality of logic gates. It should be noted that, the video encoder 110 and the video decoder 120 are implemented at different device platforms in the present embodiment. However, in other embodiments, they may be implemented at a same device platform. The detailed functionality of each circuit in the video encoder 110 and the video decoder 120 would be disclosed along with the flows of the proposed video encoding method in FIG. 2 and the proposed video decoding method in FIG. 7.

[First Embodiment]

Figure 2:
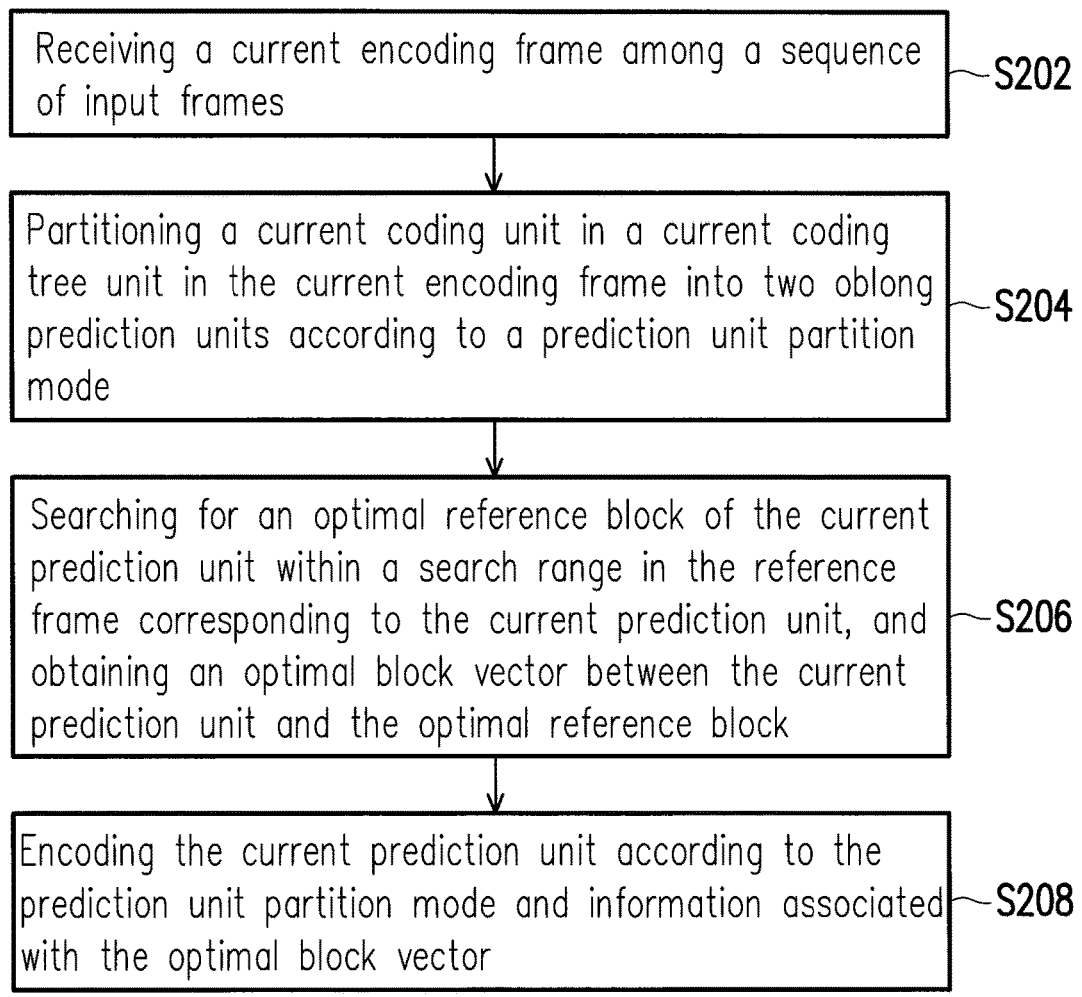
FIG. 2 illustrates a flowchart of a video encoding method according to an embodiment of the invention.

FIG. 2 illustrates a flowchart of a video encoding method according to an embodiment of the invention. Detailed steps of the proposed method in FIG. 2 would be implemented by the components of the video encoder 110 in FIG. 1.

Referring to both FIG. 1 and FIG. 2, the receiving circuit 112 of the video encoder 110 receives a current encoding frame among a sequence of input frames (Step S202). That is, after the receiving circuit 122 receives the sequence of input frames from the video source 101, the other circuits in the video encoder 110 would start performing an encoding process on the sequence of input frames. For simplicity purposes, only one of the input frames (referred to as a "current encoding frame" hereafter) would be illustrated.

In the H.265/HEVC video encoding mechanism, the current encoding frame includes a plurality of coding tree units, where the size of each of the coding trees may be 64×64, 32×32, or 16×16 (in pixel). Each of the coding tree units further includes one or more coding units, where each of the coding units is a square having a same size as or a smaller size than one coding tree unit. The size of each of the coding units may be 64×64, 32×32, 16×16, or 8×8, and may be represented as 2N×2N. In the present embodiment, the partition circuit 102 may further partition each of the coding units. For simplicity purposes, only one of the coding units (referred to as a "current coding unit" hereafter) would be illustrated.

To be specific, the partition circuit 114 partitions a current coding unit in a current coding tree unit in the current encoding frame into two oblong prediction units according to a prediction unit partition mode (Step S204), where each pixel within a same prediction unit is encoded by employing a same prediction mode. In an embodiment, the partition circuit 114 may select a suitable prediction unit partition mode based on partition efficiency and properties of the encoder 110. In another embodiment, the partition circuit 114 may select different prediction unit partition modes either sequentially or randomly, or based on other algorithms. Moreover, the partition circuit 114 may also set the prediction unit partition mode based on a user input. The invention is not limited herein.

It should be noted that, only 2N×2N and N×N partition modes are supported in an intra prediction mode (including an intra-block copy mode) in the conventional mechanism. In other words, in the intra prediction mode, a coding unit may only be partitioned into one or multiple prediction units in squares. However, the partition circuit 114 in the present embodiment may partition the current coding unit into two oblong prediction units according to the prediction unit partition mode, where at least one of the prediction units may be encoded by intra prediction. In other words, at least one of reference frames of the two prediction units in the current coding unit may be the current encoding frame.

Yet in other embodiments, the conventional mechanism may also be supported, where all of the prediction units may be encoded by intra prediction. In other words, the partition circuit 114 would not partition the coding units (i.e. the size of a prediction unit, is equal to that of a coding unit, 2N×2N) or would partition each of the coding units into four prediction units having a size of N×N. The invention is not limited herein.

FIG. 3A-FIG. 3D illustrate multiple examples of prediction unit partition modes according to an embodiment of the invention. In the present embodiment, the prediction unit partition mode of the partition circuit 114 may be categorized into a horizontal partition or a vertical partition for partitioning the current coding unit into two oblong prediction units.

Figure 3A:
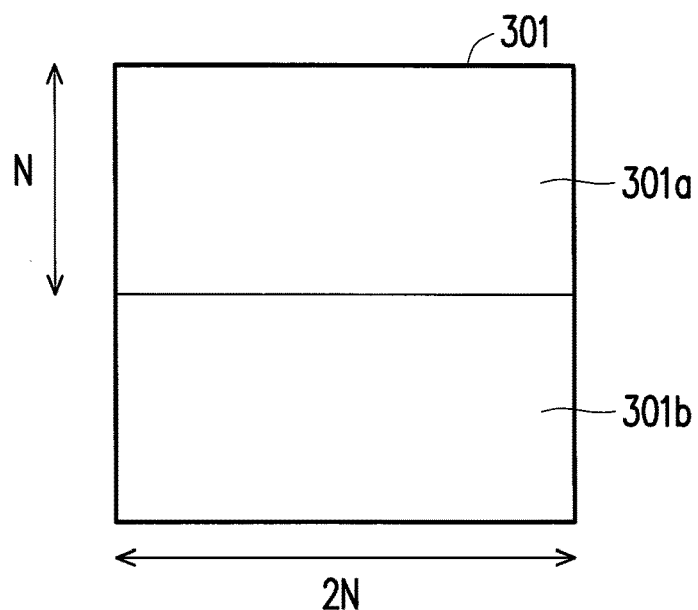
FIG. 3A-FIG. 3D illustrate multiple examples of the prediction unit partition mode according to an embodiment of the invention.
Figure 3B:
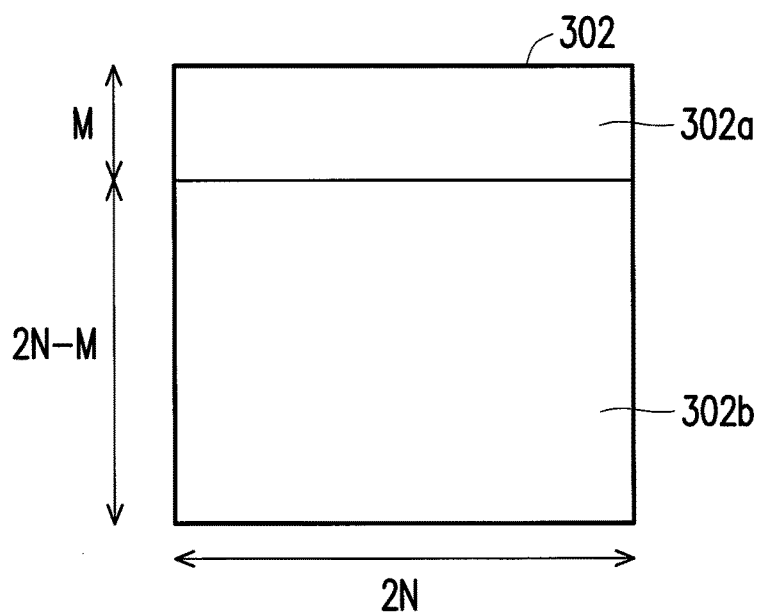
Figure 3C:
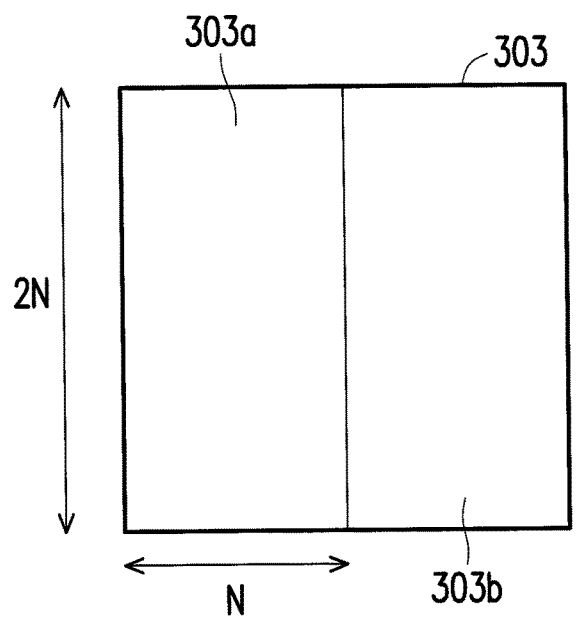
Figure 3D:
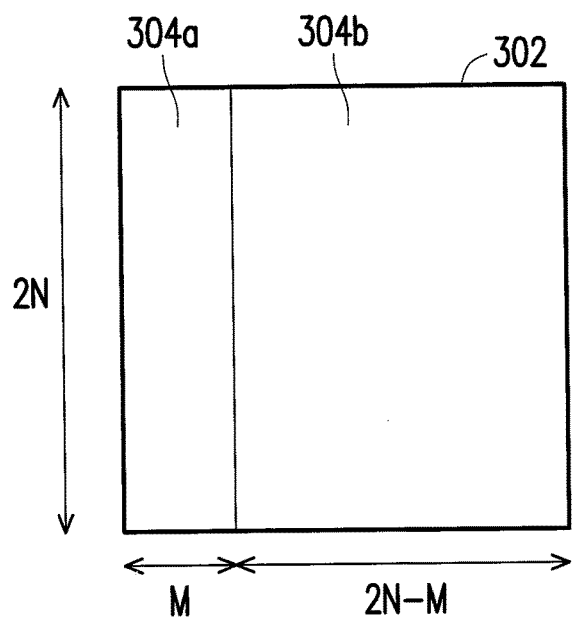

In the example illustrated in FIG. 3A, a current coding unit 301 is horizontally partitioned by the partition circuit 114 into two equally-sized prediction units 301a and 301b of a size 2N×N. In the example illustrated in FIG. 3B, a current coding unit 302 is horizontally partitioned by the partition circuit 102 into a prediction unit 302a with a size of 2N×M and a prediction unit 302b with a size of 2N×(2N−M). In the example illustrated in FIG. 3C, a current coding unit 303 is vertically partitioned by the partition circuit 114 into two equally-sized prediction units 303a and 303b of a size N×2N. In the example illustrated in FIG. 3D, a current coding unit 304 is vertically partitioned by the partition circuit 114 into a prediction unit 304a with a size of M×2N and a prediction unit 304b with a size of (2N−M)×2N. In these examples, M is an exponent of 2 such as 1, 2, 4, . . . , or 2N, and M≠N.

Since the technique for processing the two prediction units in the current coding unit is the same, only one of the prediction units (referred to as a "current prediction unit" hereafter) would be illustrated.

Revisiting FIG. 2, the search circuit 116 searches for an optimal reference block corresponding to the current prediction unit within a search range in the reference frame corresponding to the current prediction unit, and obtains an optimal block vector between the current prediction unit and the optimal reference block (Step S206). To be specific, the reference frame corresponding to the current prediction unit may be the current encoding frame in the intra prediction mode or any reconstructed frame in the inter prediction mode. It should be noted that, as mentioned previously, since at least one of the prediction units would be encoded by intra prediction in the present embodiment, the reference frame of at least one of the two prediction units in the current coding unit is the current encoding frame. Moreover, in an embodiment, when the width or the height of the current prediction unit is 1, its corresponding reference frame may be set as the current encoding frame.

In the present embodiment, assume that the reference frame of the current reference block is the current encoding frame. The search range of the optimal reference block may be one of the followings, and yet the invention is not limited herein. In an example, the search range may be an encoded region in the reference frame, while in another example, the search range may be the entire reference frame.

In some cases, the search range may be more restricted. In one of the examples, the search range may be a portion within the reference frame, where such portion excludes the current coding unit and unencoded regions. For instance, the search range may be the current coding tree unit in the current coding unit and n coding trees extended along a first direction (e.g. left) of the current coding unit, where n is an integer and n≥0. In another example, the search range may also be a portion within the reference frame, where such portion includes encoded regions, the current coding unit, and unencoded regions. In another example, the search range may be a neighboring range of a point pointed by a block vector predictor (BVp) in the reference frame.

The search circuit 116 may determine a candidate reference block with a best match (i.e. the aforesaid optimal reference block) to the current prediction unit. The search technique employed by the search circuit 116 may be categorized into a non-perfect match approach and a perfect match approach.

The non-perfect match approach allows distortions between the pixels in the current prediction unit and the pixels of its candidate reference blocks. The search circuit 116 may calculate a cost between the current prediction unit and each of the reference blocks within the search range, where each of the costs is a distortion associated with luminance and chroma between the current prediction unit and each of the candidate reference blocks in conjunction with a bit rate for encoding a block vector (a relative position) between the current prediction unit and each of the candidate reference blocks. The calculation on the aforesaid distortions may be based on losses in luma and chroma, where the distortions may be determined by sum of absolute difference (SAD), mean absolute difference (MAD), and mean absolute difference (MAD), and yet the invention is not limited thereto.

A perfect match indicates that the pixel values of the current prediction unit and those of its candidate reference blocks are the same. That is, the distortions in luminance and chroma are both 0. The search circuit 116 may calculate the cost between the current prediction unit and each of the candidate reference blocks within the search range, where the cost may be the bit rate for encoding the corresponding block vector between the current prediction unit and each of the candidate reference blocks.

As for a non-perfect search, the searching circuit 116 may calculate a first cost of each of the candidate reference blocks (i.e. the sum of the distortion in luminance and the bit rate for encoding the corresponding block vector), and may set the candidate reference blocks with the m lowest first costs as "possible optimal reference blocks", where m is a positive integer and may be 1, 2, 3, . . . , 8, empirically. Next, the search circuit 103 may further calculate a second cost of each of the possible optimal reference blocks (i.e. the sum of the distortion in chroma and the corresponding first cost). The search circuit 116 may set the possible optimal reference block with the minimum second cost as the "optimal reference block". The block vector between the current prediction unit and the optimal reference block may be referred to as an "optimal block vector".

Figure 4A:
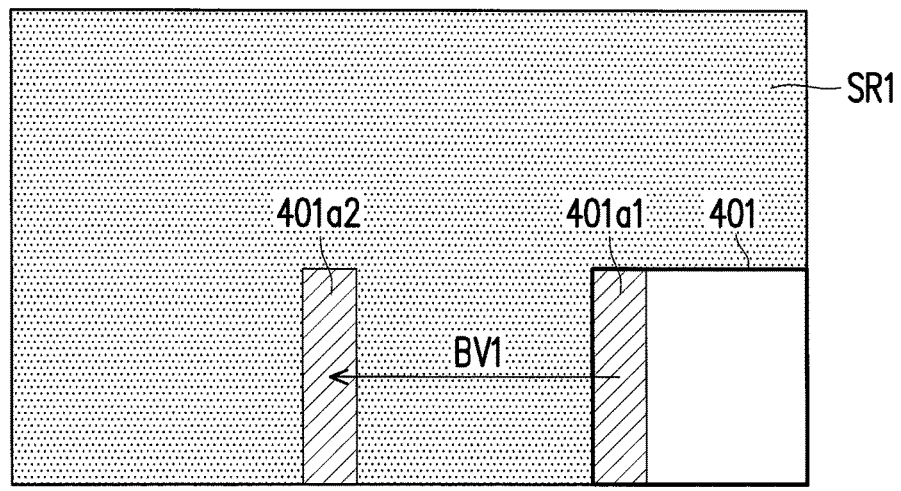
FIG. 4A-FIG. 4C illustrate multiple examples of searching approaches according to embodiments of the invention.
Figure 4B:
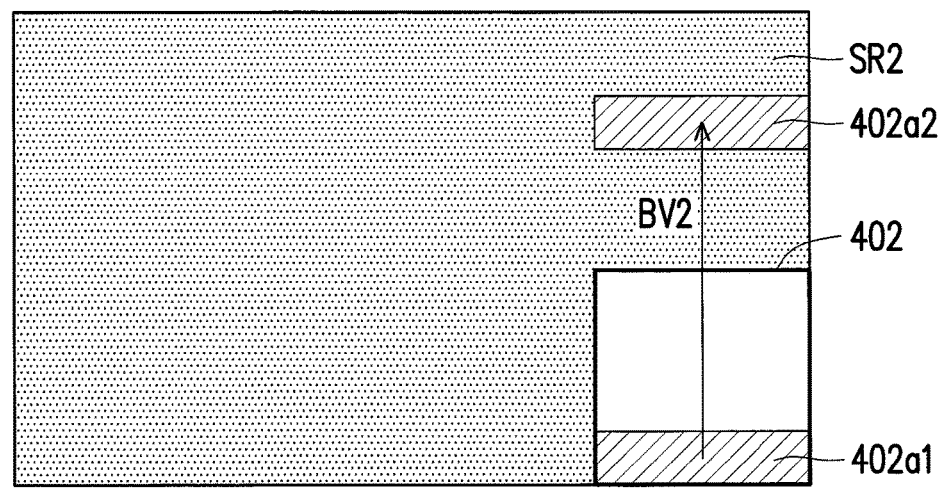
Figure 4C:
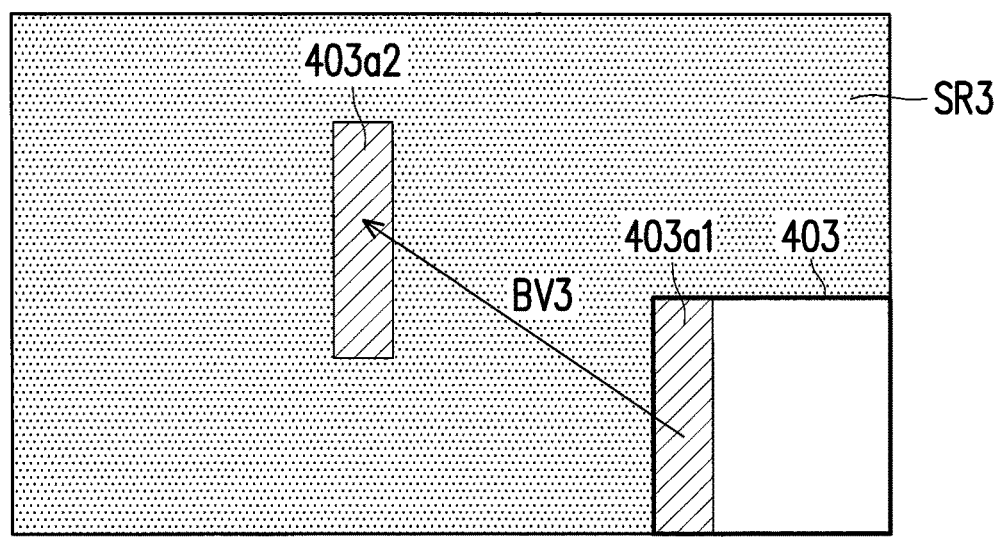

The search circuit 116 may search for the optimal reference block in the search range in various search approaches as illustrated in FIG. 4A-FIG. 4C according to an embodiment of the invention.

In an embodiment, the search circuit 116 may search for the optimal candidate reference block of the current prediction unit by a one-dimensional search; that is, in a horizontal direction, a vertical direction, or a horizontal and a vertical direction. As illustrated in FIG. 4A, the search circuit 116 may perform searching along the horizontal direction of a current prediction unit 401a1 of a current coding unit 401 within a search range SR1. Assume that a block 401a2 is the optimal reference block, and then a block vector BV1 would be the optimal block vector. As illustrated in FIG. 4B, the search circuit 116 may perform searching along the vertical direction of a current prediction unit 402a1 of a current coding unit 402 within a search range SR2. Assume that a block 402a2 is the optimal reference block, and then a block vector BV2 would be the optimal block vector. Moreover, in another embodiment, the search circuit 116 may perform searching along the horizontal direction in conjunction with the vertical direction, and yet the invention is not limited herein.

In an embodiment, the search circuit 116 may search for the optimal candidate reference block of the current prediction unit by a two-dimensional search. The search circuit 116 may search for the optimal reference block from each of the candidate reference blocks within the search range. As illustrated in FIG. 4C, the search circuit 116 may search for the optimal reference block of a current prediction unit 403a1 in a current coding unit 403 within a search range SR3. Assume that a block 403a2 is the optimal reference block, and then a block vector BV3 would be the optimal block vector.

Revisiting FIG. 2, after the search circuit 116 searches out the optimal reference bock corresponding to the current prediction unit and obtains the optimal block vector, the encoding circuit 118 would encode the current prediction unit according to the prediction unit partition mode and information associated with the optimal block vector (Step S208). The information of the optimal block vector may include a block vector prediction and a block vector difference (BVD). The technique for block vector prediction in the inter-prediction mode and the intra-prediction mode would be illustrated hereafter.

Figure 5A:
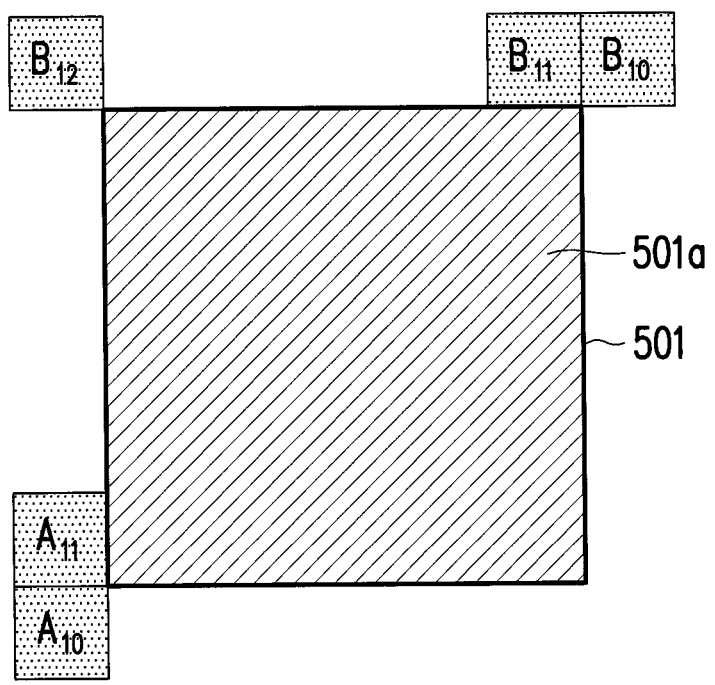

FIG. 5A-FIG. 5C illustrate three examples of block vector prediction in inter prediction according to an embodiment of the invention.

In the example illustrated in FIG. 5A, the size of a current coding unit 501 and that of a current prediction unit 501a are the same. In other words, the current coding unit 500 is not partitioned by the partition circuit 114. In this example, the encoding circuit 118 may select two block vectors as the candidate block vector predictors in the following order.

First, the encoding circuit 118 may select a block vector sequentially from a bottom-left block $A_{10}$ and a left block $A_{11}$ with respect to a current prediction unit 501a. To be specific, the encoding circuit 118 may first determine whether the bottom-left block $A_{10}$ corresponds to the inter prediction mode and exists a block vector. If yes, the encoding circuit 118 may set the bottom-left block $A_{10}$ as one of the candidate block vector predictors and skip the left block $A_{11}$. If no, the encoding circuit 118 may further determine whether the left block $A_{11}$ corresponds to the inter prediction mode and exists a block vector and set the left block $A_{11}$ as one of the candidate block vector predictors if the determination is yes. Next, similarly, the encoding circuit 118 may select a block vector as one of the candidate block vector predictors sequentially from a upper-right block $B_{10}$, a upper block $B_{11}$, and a upper-left block $B_{12}$ with respect to the current prediction unit 501a. It should be noted that, the size of each of the bottom-left block $A_{10}$, the left block $A_{11}$, the upper-right block $B_{10}$, the upper block $B_{11}$, and the upper-left block $B_{12}$ may be 4×4.

Moreover, if there only exists one candidate block vector predictor among the bottom-left block $A_{10}$, the left block $A_{11}$, the upper-right block $B_{10}$, the upper block $B_{11}$, and the upper-left block $B_{12}$, the encoding circuit 118 may set an immediately preceding encoded block vector temporally corresponding to the inter prediction mode as one of the candidate block vector predictors. If there exists no candidate block vector predictor among the aforesaid blocks, the encoding circuit 118 may set two immediately preceding encoded block vector temporally corresponding to the inter prediction mode as the two candidate block vector predictors. After the encoding circuit 118 obtains two candidate block vector predictors, it may set the candidate block vector predictor with a lower bit rate for encoding the block vector difference as an "optimal block vector predictor", where each of the block vector differences is a vector difference between each of the candidate block vector predictors and the optimal block vector of the current prediction unit.

In the example illustrated in FIG. 5B1, a current coding unit 502 includes two prediction units, where a current prediction unit 502a is the first prediction unit in the current coding unit 502. In other words, when the partition circuit 114 partitions the current coding unit 502 vertically, the first prediction unit would be a left-most prediction unit 502a. In the example illustrated in FIG. 5B2, when the partition circuit 114 partitions a current coding unit 512 horizontally, the first prediction unit would be an upper-most prediction unit 512a.

Referring to FIG. 5B1, in this example of a vertical partition, the encoding circuit 118 may select two block vectors as candidate blocks vector predictors in the following order. First, the encoding circuit 118 may select a block vector sequentially from a bottom-left block $A_{20}$ and a left block $A_{21}$ with respect to a current prediction unit 502a to be one of the candidate block vector predictors. Next, the encoding circuit 118 may select a block vector sequentially from an upper-right block $B_{20}$, an upper block $B_{21}$, and an upper-left block $B_{22}$ with respect to the current prediction unit 502a to be one of the candidate block vector predictors. If the encoding circuit 118 only obtains one or zero candidate block vector predictors, it may set one or two immediately preceding encoded block vectors temporally corresponding to the inter prediction mode as the candidate block vector predictor(s). After the encoding circuit 118 obtains two candidate block vector predictors, it may set the candidate block vector predictor with a lower bit rate for encoding the block vector difference as an optimal block vector predictor.

Now referring to FIG. 5B2, in this example of a horizontal partition, the encoding circuit 118 may select a block vector sequentially from a bottom-left block $A_{200}$ and a left block $A_{201}$ with respect to a current prediction unit 512a to be one of the candidate block vector predictors. Next, the encoding circuit 118 may select a block vector sequentially from an upper-right block $B_{200}$, an upper block $B_{201}$, and an upper-left block $B_{202}$ with respect to the current prediction unit 512a to be one of the candidate block vector predictors. If the encoding circuit 118 only obtains one or zero candidate block vector predictors, it may set one or two immediately preceding encoded block vectors temporally corresponding to the inter prediction mode as the candidate block vector predictor(s). After the encoding circuit 118 obtains two candidate block vector predictors, it may set the candidate block vector predictor with a lower bit rate for encoding the block vector difference as the optimal block vector predictor.

In the examples of FIG. 5C1 and FIG. 5C2, both a current coding unit 503 and a current coding unit 513 include two prediction units, where each of a current prediction unit 503b and a current prediction unit 513b is a non-first prediction unit in the current coding unit 503 and the current coding unit 513 respectively.

Referring to FIG. 5C1, in this example of a vertical partition, the encoding circuit 118 may select two block vectors as the candidate block vector predictors in the following order. First, the encoding circuit 118 may select a block vector sequentially from a bottom-left block $A_{30}$ and a left block $A_{31}$ with respect to a current prediction unit 503b in the current coding unit 503 to be one of the candidate block vector predictors. Next, the encoding circuit 118 may select a block vector sequentially from an upper-right block $B_{30}$, an upper block $B_{31}$, and an upper-left block $B_{32}$ with respect to the current prediction unit 503b to be one of the candidate block vector predictors. If the encoding circuit 118 only obtain one or zero candidate block vector predictors, it may set one or two immediately preceding encoded block vectors temporally corresponding to the inter prediction mode as the candidate block vector predictor(s). After the encoding circuit 118 obtains two candidate block vector predictors, it may set the candidate block vector predictor with a lower bit rate for encoding the block vector difference as the optimal block vector predictor.

Referring to FIG. 5C2, in this example of a horizontal partition, the encoding circuit 118 may select two block vectors as the candidate block vector predictors in the following order. First, the encoding circuit 118 may select a block vector sequentially from a bottom-left block $A_{300}$ and a left block $A_{301}$ with respect to a current prediction unit 513b in the current coding unit 513 to be one of the candidate block vector predictors. Next, the encoding circuit 118 may select a block vector sequentially from an upper block $B_{301}$ and an upper-left block $B_{302}$ with respect to the current prediction unit 513b to be one of the candidate block vector predictors. If the encoding circuit 118 only obtains one or zero candidate block vector predictors, it may set one or two immediately preceding encoded block vectors temporally corresponding to the inter prediction mode as the candidate block vector predictor(s). After the encoding circuit 118 obtains two candidate block vector predictors, it may set the candidate block vector predictor with a lower bit rate for encoding the block vector difference as the optimal block vector predictor.

FIG. 6A-FIG. 6E illustrate three examples of block vector prediction in intra prediction according to an embodiment of the invention.

Figure 6A:
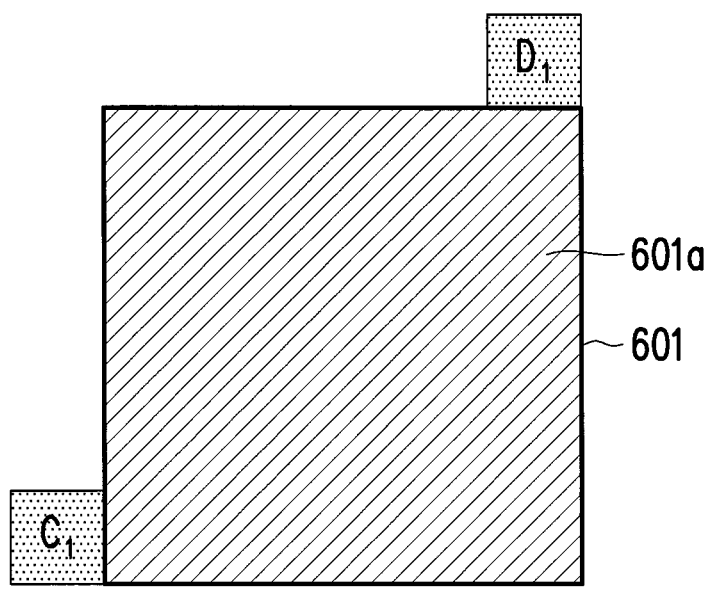
FIG. 6A-FIG. 6E illustrate three examples of the block vector prediction in intra prediction according to an embodiment of the invention.

For both the first prediction unit and the second prediction unit in intra prediction, the encoding circuit 118 may select two candidate block vector predictors sequentially from a bottom-left block, a upper-right block, or two immediately preceding encoded block vectors and may set the candidate block vector predictor with a lower bit rate for encoding a block vector difference as the optimal block vector predictor. Hence, in the example of a current coding unit 601 having a same size as a current prediction unit 601a as illustrated in FIG. 6A, the encoding circuit 118 may select a block vector sequentially from a bottom-left block $C_1$ and a upper-right block $D_1$ with respect to a current prediction unit 601a. To be specific, the encoding circuit 118 may first determine whether the bottom-left block $C_1$ corresponds to the intra prediction mode and exists a block vector. If yes, the encoding circuit 118 may set the bottom-left block $C_1$ as one of the candidate block vector predictors. Next, the encoding circuit 118 may further determine whether the upper-right block $D_1$ corresponds to the intra prediction mode and exists a block vector. If yes, the encoding circuit 118 may set the upper-right block $D_1$ as one of the candidate block vector predictors. If the encoding circuit 118 only obtains one or zero candidate block vector predictors, it may set one or two immediately preceding encoded block vectors temporally corresponding to the inter prediction mode as the candidate block vector predictor(s). After the encoding circuit 118 obtains two candidate block vector predictors, it may set the candidate block vector predictor with a lower bit rate for encoding the block vector difference as the optimal block vector predictor.

Figure 6B:
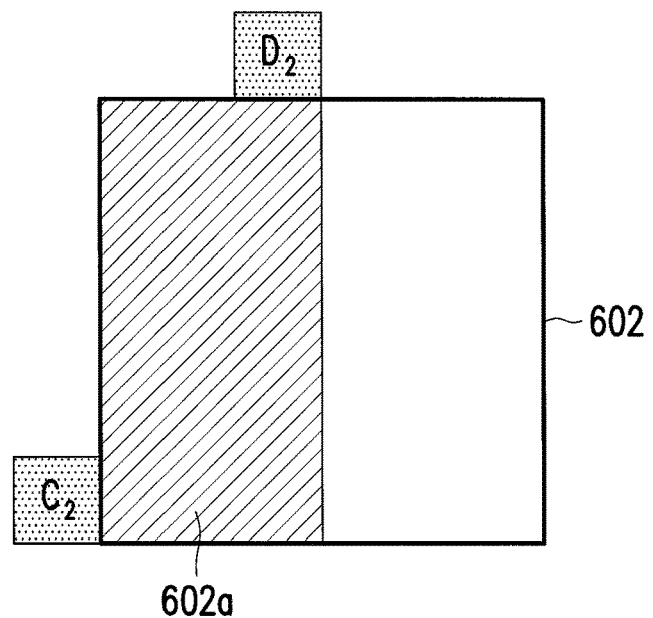
Figure 6C:
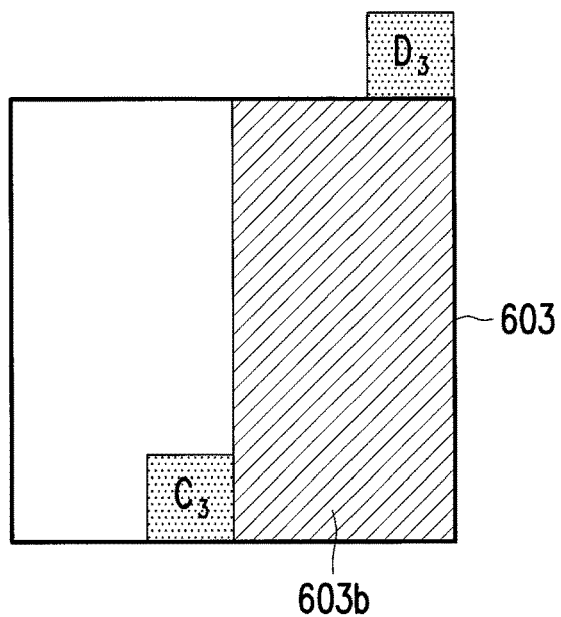

Similarly, in the example as illustrated in FIG. 6B, the encoding circuit 118 may select two block vectors sequentially from a bottom-left block $C_2$, a upper-right block $D_2$ with respect to a prediction unit 602b in a current coding unit 602, one or two immediately preceding encoded block vectors temporally corresponding to the intra prediction mode for determining the optimal block vector predictor. In the example as illustrated in FIG. 6C, the encoding circuit 118 may select two block vectors sequentially from a bottom-left block $C_3$, a upper-right block $D_3$ with respect to a current prediction unit coding unit 603b in the current coding unit 603, one or two immediately preceding encoded block vectors temporally corresponding to the intra prediction mode for determining the optimal block vector predictor.

Figure 6D:
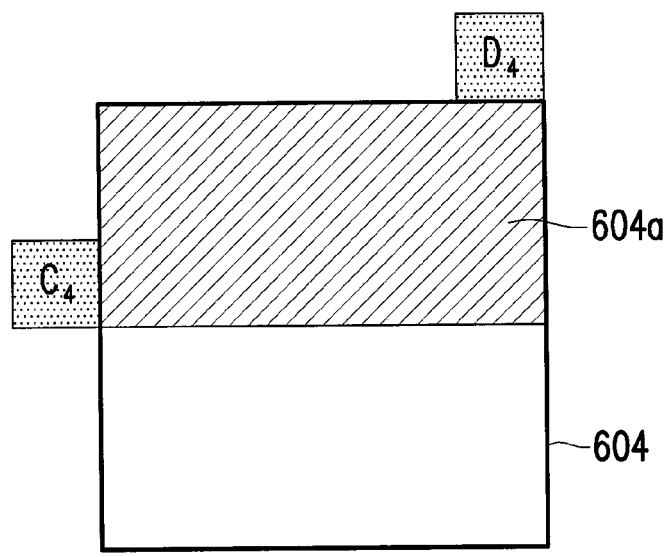
Figure 6E:
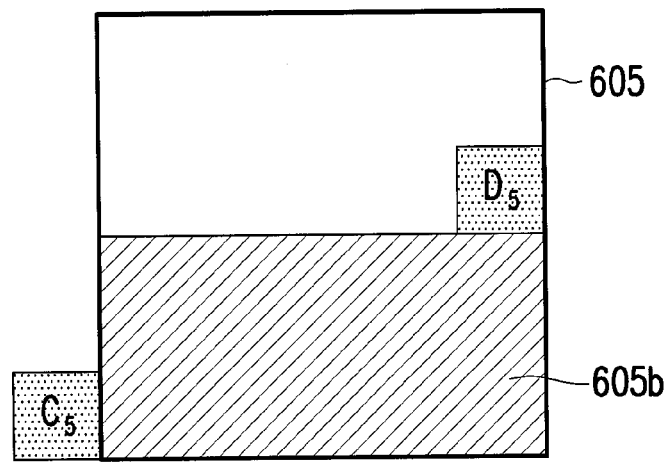

In the example as illustrated in FIG. 6D, the encoding circuit 118 may select two block vectors sequentially from a bottom-left block $C_4$, a upper-right block $D_4$ with respect to a current prediction unit 604a in the current coding unit 604, one or two immediately preceding encoded block vectors temporally corresponding to the intra prediction mode for determining the optimal block vector predictor. In the example as illustrated in FIG. 6E, the encoding circuit 118 may select two block vectors sequentially from a bottom-left block $C_5$, a upper-right block $D_5$ with respect to a current prediction unit coding unit 605b in the current coding unit 605, one or two immediately preceding encoded block vectors temporally corresponding to the intra prediction mode for determining the optimal block vector predictor.

After the encoding circuit 118 obtains the optimal block vector predictor of the current prediction unit and the corresponding block vector difference, it may encode a flag to indicate that which block vector is set as the optimal block vector predictor. After the encoding circuit 118 obtains the block vector difference corresponding to the optimal block vector predictor, it may perform a variable length coding such as Huffman coding or Arithmetic coding thereon.

Moreover, in an embodiment, not only may an encoding process be performed on the current prediction unit according to the prediction unit partition mode and the information associated with the optimal block vector (i.e. the block vector prediction and the block vector difference), but a residual associated with the current prediction may also be computed. To be specific, the video encoder 110 may further include a calculation circuit (not shown). After the search circuit 116 completes searching for the optimal reference block, the calculation circuit may copy all pixel values in each of the optimal reference blocks to a temporary block, where the temporary block and the coding units have an equal size. Next, the encoding circuit 118 may calculate the residual according to the pixel values in the temporary block and the original pixel values in the coding units and may store the residual in the temporary block. The encoding circuit 118 may partition the temporary block into one, four, or more transform units. A calculation circuit (not shown) may perform cross component prediction (CCP), residual differential pulse coding modulation (RDPCM), discrete cosine transform (DCT), and quantization on each of the transform units. In an embodiment, the calculation circuit may skip RDPCM and DCT. Next, the encoding circuit 118 may encode the quantized residual. However, it should be noted that, the encoding circuit 118 may select not to encode the residual in an embodiment.

Also, the calculation circuit may copy all pixel values of the optimal reference block in each of the prediction units in the current coding unit to a reconstructed block, where the reconstructed block and the coding units have an equal size. The calculation circuit may perform inverse quantization, inverse DCT, inverse CCP on the quantized residual to obtain a residual, sum the residual and the pixel values of the reference block stored in the reconstructed block, and thereby obtain and store the coding units in, for example, a frame memory (not shown) for future encoding references.

In the present embodiment, after the video encoder 110 completes encoding, it may transmit the encoded video and the related information to the video receiving platform 100B through the network 150, and the video decoder 120 may decode the encoded video according to the related information.

Figure 7:
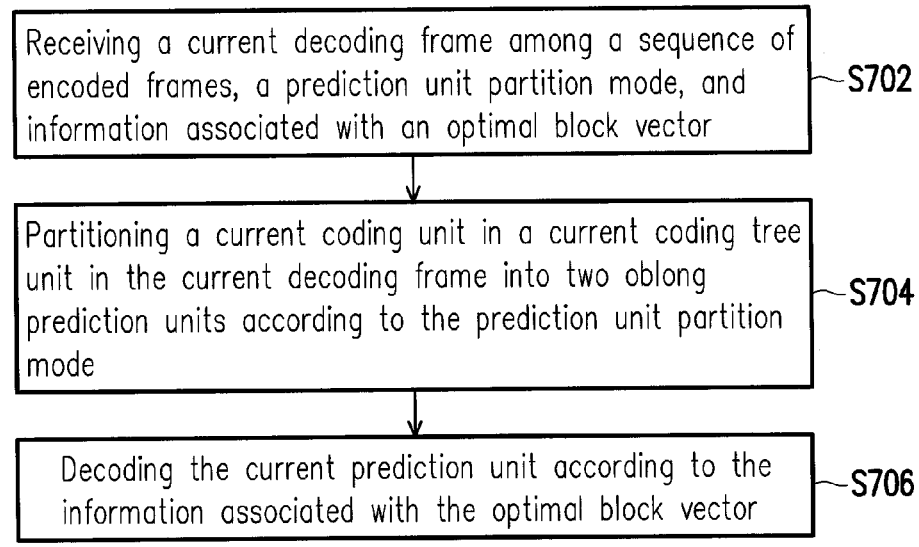
FIG. 7 illustrates a flowchart of a video decoding method according to an embodiment of the invention.

FIG. 7 illustrates a flowchart of a video decoding method according to an embodiment of the invention. Detailed steps of the proposed method in FIG. 7 would be implemented by the components of the video decoder 120 in FIG. 1.

Referring to FIG. 7, the receiving circuit 122 of the video decoder 120 receives a current decoding frame among a sequence of encoded frames, a prediction unit partition mode, and information associated with an optimal block vector (Step S702). The prediction unit partition mode and the optimal block vector herein are the encoded information in Step S208 of FIG. 2, where the detailed information may refer to the previous paragraphs and would not be repeated hereinafter.

Next, the partition circuit 124 partitions a current coding unit in a current coding tree unit in the current decoding frame into two oblong prediction units according to the prediction unit partition mode (Step S704). The decoding circuit 128 decodes the current prediction unit according to the information associated with the optimal block vector (Step S706). In other words, the partition circuit 124 may partition the current coding unit according to the prediction unit partition mode received from the video encoder 110, and the decoding circuit 128 may reconstruct the block vector of the current prediction unit according to the optimal block vector predictor and its block vector difference received from the video encoder 110 so as to decode the current prediction unit. Moreover, if the receiving circuit 122 receives a residual associated with the current prediction unit from the video encoder 110, it may decode the residual after reconstructing the block vector. In the present embodiment, all decoded frames would be output from the video decoder 120 to the player 105 for video playing.

[Second Embodiment]

The second embodiment is similar to the first embodiment, and only the differences therebetween would be illustrated. The video encoding method employed in the first embodiment is to partition each coding unit into two oblong prediction units in the partition process, while the video encoding method employed in the second embodiment is to further partition each prediction unit into a plurality of sub-blocks in the partition process.

Figure 8:
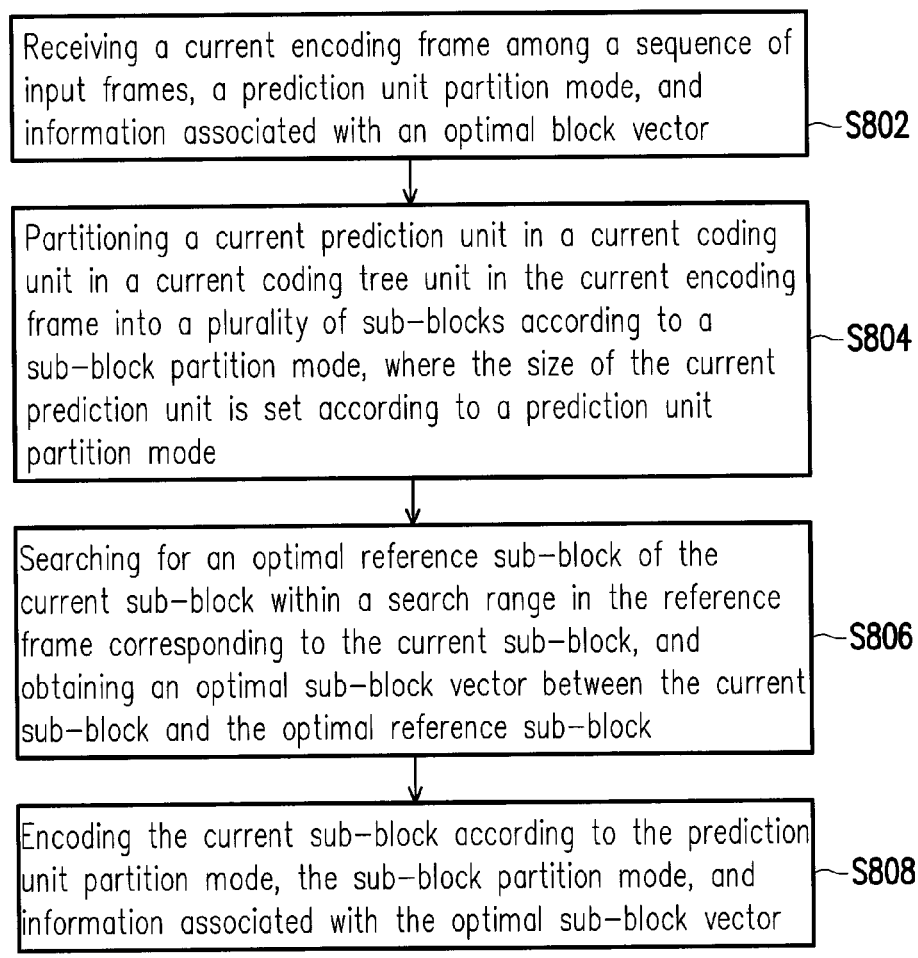
FIG. 8 illustrates a flowchart of a video encoding method according to an embodiment of the invention.

FIG. 8 illustrates a flowchart of a video encoding method according to an embodiment of the invention. Detailed steps of the proposed method in FIG. 8 would be implemented by the components of the video encoder 110 in FIG. 1.

Referring to both FIG. 1 and FIG. 8, the receiving circuit 112 of the video encoder 110 receives a current encoding frame among a sequence of input frames (Step S802). Next, the partition circuit 114 partitions a current prediction unit in a current coding unit in a current coding tree unit in the current encoding frame into a plurality of sub-blocks according to a sub-block partition mode, where the size of the current prediction unit is set based on a prediction unit partition mode (Step S804). To be specific, in the present embodiment, after the partition circuit 102 partitions the current coding unit, it may further partition each of the prediction units therein. For simplicity purposes, only one of the prediction units (referred to as a "current prediction unit" hereafter) would be illustrated. The size of the current prediction unit may be set to 2N×2N, 2N×N, 2N×M, 2N×(2N−M), N×2N, M×2N, or (2N−M)×2N according to the prediction unit partition mode, where M is an exponent of 2, M is 1, 2, 4, . . . , or 2N, and M≠N.

In the present embodiment, the sub-block unit partition mode of the partition circuit 114 may also be categorized into a horizontal partition or a vertical partition for partitioning the current prediction unit into a plurality of sub-blocks.

In an embodiment, when the sub-block partition mode is a horizontal partition and the width of each of the sub-blocks is equal to that of the current prediction unit, there would be two cases. When the height of each of the sub-blocks is 1 (i.e. a line-based partition is performed on the current prediction unit), the size of each of the sub-blocks would be one of the followings: when the size of the current prediction unit is 2N×2N, 2N×N, 2N×M, or 2N×(2N−M), the size of each of the sub-blocks is 2N×1; when the size of the current prediction unit is N×2N, the size of each of the sub-blocks is N×1; when the size of the current prediction unit is M×2N, the size of each of the sub-blocks is M×1; and when the size of the current prediction unit is (2N−M)×2N, the size of each of the sub-blocks is (2N−M)×1.

On the other hand, when the height of each of the sub-blocks is L, the size of each of the sub-blocks would be one of the followings: when the size of the current prediction unit is 2N×N, the size of each of the sub-blocks is 2N×L, where 1<L when the size of the current prediction unit is 2N×M, the size of each of the sub-blocks is 2N×L, where 1<L≤M; when the size of the current prediction unit is 2N×(2N−M), the size of each of the sub-blocks is 2N×L, where 1<L≤2N−M; when the size of the current prediction unit is N×2N, the size of each of the sub-blocks is N×L, where 1<L≤2N; when the size of the current prediction unit is M×2N, the size of each of the sub-blocks is M×L, where 1<L≤2N; and when the size of the current prediction unit is (2N−M)×2N, the size of each of the sub-blocks is (2N−M)×L, where 1<L≤2N. In these cases, L is an exponent of 2. It should be noted that, when the value of L is set to a value greater or equal to a maximum value within its belonging range, the partition circuit 114 would not partition the current prediction unit.

In an embodiment, when the sub-block partition mode is a vertical partition and the height of each of the sub-blocks is equal to that of the current prediction unit, there would be two cases. When the width of each of the sub-blocks is 1 (i.e. a line-based partition is performed on the current prediction unit), the size of each of the sub-blocks would be one of the followings: when the size of the current prediction unit is 2N×2N, N×2N, M×2N, or (2N−M)×2N, the size of each of the sub-blocks is 1×2N; when the size of the current prediction unit is 2N×N, the size of each of the sub-blocks is 1×N; when the size of the current prediction unit is 2N×M, the size of each of the sub-blocks is 1×M; and when the size of the current prediction unit is 2N×(2N−M), the size of each of the sub-blocks is 1×(2N−M).

On the other hand, when the width of each of the sub-blocks is L, the size of each of the sub-blocks is one of the followings: when the size of the current prediction unit is 2N×2N, the size of each of the sub-blocks is L×2N, where 2N; when the size of the current prediction unit is 2N×N, the size of each of the sub-blocks is L×N, where 1<L≤2N; when the size of the current prediction unit is 2N×M, the size of each of the sub-blocks is L×M, where 1<L≤2N; when the size of the current prediction unit is 2N×(2N−M), the size of each of the sub-blocks is L×(2N−M), where 1<L≤2N; when the size of the current prediction unit is N×2N, the size of each of the sub-blocks is L×2N, where 1<L≤N; when the size of the current prediction unit is M×2N, the size of each of the sub-blocks is L×2N, where 1<L≤M; and when the size of the current prediction unit is (2N−M)×2N, the size of each of the sub-blocks is L×2N, where 1<L≤(2N−M). In these cases, L is an exponent of 2. It should be noted that, similarly, when the value of L is set to a value greater or equal to a maximum value within its belonging range, the partition circuit 114 would not partition the current prediction unit.

FIG. 9A-FIG. 9D illustrate multiple examples of prediction unit partition modes according to an embodiment of the invention.

Figure 9A:
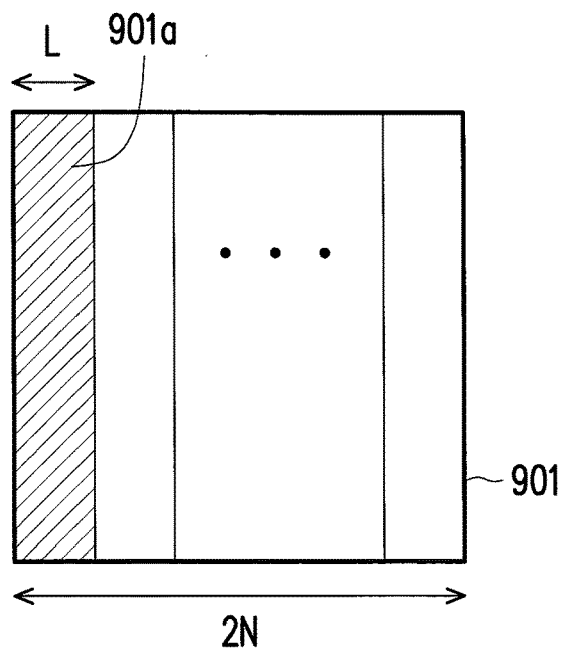
FIG. 9A-FIG. 9C illustrate multiple examples of prediction unit partition modes according to an embodiment of the invention.
Figure 9B:
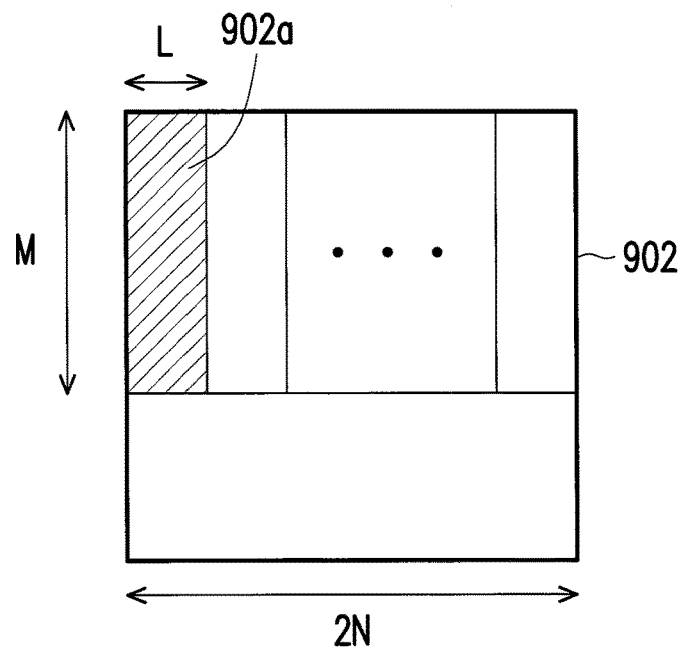
Figure 9C:
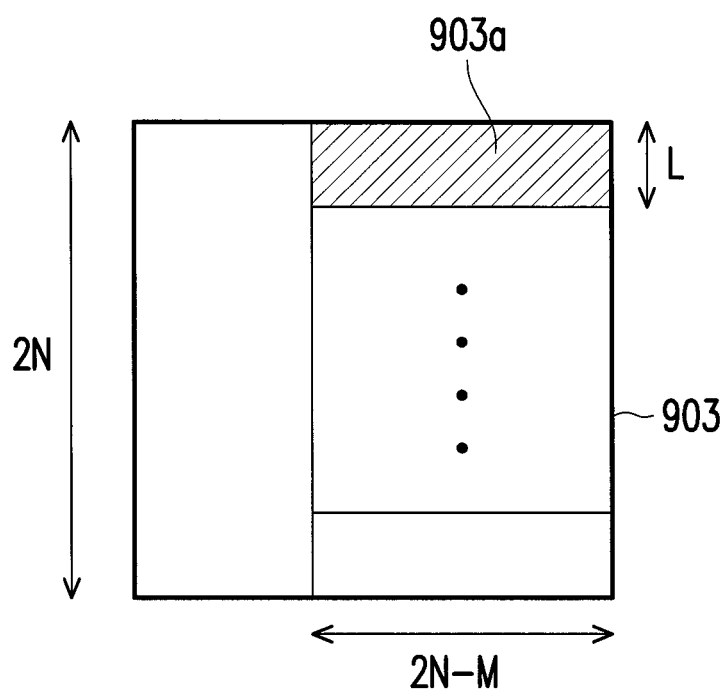

In the example illustrated in FIG. 9A, the size of a current prediction unit 901 is 2N×2N and is vertically partitioned by the partition circuit 114 into a plurality of equally-sized sub-blocks of a size 1×2N (e.g. a sub-block 901a). In the example illustrated in FIG. 9B, the size of a current prediction unit 902 is 2N×M and is vertically partitioned by the partition circuit 114 into a plurality of equally-sized sub-blocks of a size 1×M (e.g. a sub-block 901b). In the example illustrated in FIG. 9C, the size of a current prediction unit 903 is (2N−M)×2N and is vertically partitioned by the partition circuit 114 into a plurality of equally-sized sub-blocks of a size (2N−M)×L (e.g. a sub-block 901c).

Revisiting FIG. 8, since the techniques for processing all the sub-blocks in the current prediction unit are the same, only one of the sub-blocks (referred to as a "current sub-block" hereafter) would be illustrated. The search circuit 116 searches for an optimal reference sub-block of the current sub-block within a search range in the reference frame corresponding to the current sub-block, and obtains an optimal sub-block vector between the current sub-block and the optimal reference sub-block (Step S806). Similar to the first embodiment, the reference frame corresponding to the current sub-block may be the current encoding frame based on intra prediction or any reconstructed frame based on inter prediction. In the present embodiment, the reference frame of at least one of the sub-blocks in the current prediction unit is the current encoding frame. Moreover, when the width or the height of the current prediction unit is 1, its corresponding reference frame may be set as the current encoding frame.

The way that the search circuit 116 searches for the optimal reference sub-block of the current sub-block in the reference frame corresponding to the current sub-block and obtains the optimal sub-block vector is similar to the way that the circuit 116 searches for the optimal reference block of the prediction unit in the corresponding reference unit and obtains the optimal block vector in Step S206.

First, the search circuit 116 may search for a plurality of candidate reference sub-blocks within the search range and calculate a cost between the current sub-block and each of the candidate reference sub-blocks, where each of the costs is a distortion associated with luminance and chroma between the current sub-block and each of the candidate reference sub-blocks in conjunction with a bit rate for encoding a block vector between the current sub-block and each of the candidate reference sub-blocks. Next, the search circuit 116 may set the candidate reference sub-block with a minimum cost among the costs as the optimal reference sub-block. Detailed steps for obtaining the search range and calculating the costs may refer to the related description in the previous paragraphs and would not be repeated herein.

Revisiting FIG. 8, after the search circuit 116 searches out the optimal reference sub-block corresponding to the current sub-block and obtain the optimal sub-block vector, the encoding circuit 118 encodes the current sub-block according to the prediction unit partition mode, the sub-block partition mode, and information associated with the optimal sub-block vector (Step S808). The information of the optimal block vector may also include a sub-block vector prediction and a sub-block vector difference.

To be specific, when the current sub-block corresponds to the inter prediction mode and is a first sub-block within the current prediction unit (i.e. a left-most or a upper-most sub-block), the encoding circuit 118 would respectively set an optimal block vector predictor corresponding to the prediction unit at which the current sub-block is located and a block vector difference of the optimal block vector prediction as "the optimal sub-block vector predictor" and "the sub-block vector difference". The way to obtain the optimal block vector predictor of the prediction unit and its sub-block vector difference may refer to the related description for FIG. 5A-FIG. 5C and would not be repeated herein.

When the current sub-block corresponds to the intra prediction mode and is a first sub-block within the current prediction unit (i.e. a left-most or an upper-most sub-block), similar to FIG. 6A-FIG. 6C, the encoding circuit 118 may select two candidate block vector predictors sequentially from a block vector of a bottom-left block with respect to the current prediction unit, a block vector of an upper-right block with respect to the current prediction unit, and two immediately preceding encoded block vectors. The encoding circuit 118 may then obtain and respectively set the optimal block vector predictor of the current prediction unit and the block vector difference corresponding to the optimal block vector predictor as "the optimal sub-block vector" and the "sub-block vector difference" corresponding to the current sub-block.

It should be noted that, in the present embodiment, when the current sub-block is not the first block in the current prediction unit, the encoding circuit 118 may set the information of the optimal sub-block vector corresponding to a previously encoded sub-block in the current prediction unit as the information of the optimal sub-block vector in the current sub-block. The way of doing so is due to a high possibility of the similarity between the current sub-block and its previous sub-block.

After the encoding circuit 118 obtains the optimal sub-block vector predictor of the current sub-block and the corresponding sub-block vector difference, it may encode a flag to indicate that which sub-block vector is set as the optimal sub-block vector predictor. After the encoding circuit 118 obtains the sub-block vector difference corresponding to the optimal sub-block vector predictor, it may perform a variable length coding such as Huffman coding or Arithmetic coding thereon.

Furthermore, similar to the first embodiment, not only may the encoding circuit 118 encode the current sub-block according to the sub-block partition mode and the information associated with the optimal sub-block vector, but the calculation circuit may also compute a residual associated with the current sub-block. To be specific, after the search circuit 116 completes searching for the optimal reference sub-block in each of the sub-blocks in each of the prediction units in the current coding unit, the calculation circuit may copy all pixel values in each of the optimal reference sub-blocks to a temporary block, where the temporary block and the coding units have an equal size. Next, the encoding circuit 118 may calculate the residual according to the pixel values in the temporary block and the original pixel values in the coding units and may store the residual in the temporary block. The encoding circuit 118 may partition the temporary block into one, four, or more transform units. The calculation circuit may perform CCP, RDPCM, DCT, and quantization on each of the transform units. In an embodiment, the calculation circuit may skip RDPCM and DCT. Next, the encoding circuit 118 may encode the quantized residual. However, it should be noted that, the encoding circuit 118 may select not to encode the residual in an embodiment.

Also, the calculation circuit may copy all pixel values of the optimal reference sub-block in each of the prediction units in the current coding unit to a reconstructed block, where the reconstructed block and the coding units have an equal size. A calculation circuit (not shown) may perform inverse quantization, inverse DCT, inverse CCP on the quantized residual to obtain a residual, sum the residual and the pixel values of the reference block stored in the reconstructed block, and thereby obtain and store the coding units in, for example, a frame memory (not shown) for future encoding references.

In the present embodiment, after the video encoder 110 completes encoding, it may transmit the encoded video and the related information to the video receiving platform 100B through the network 150, and the video decoder 120 may decode the encoded video according to the related information.

Figure 10:
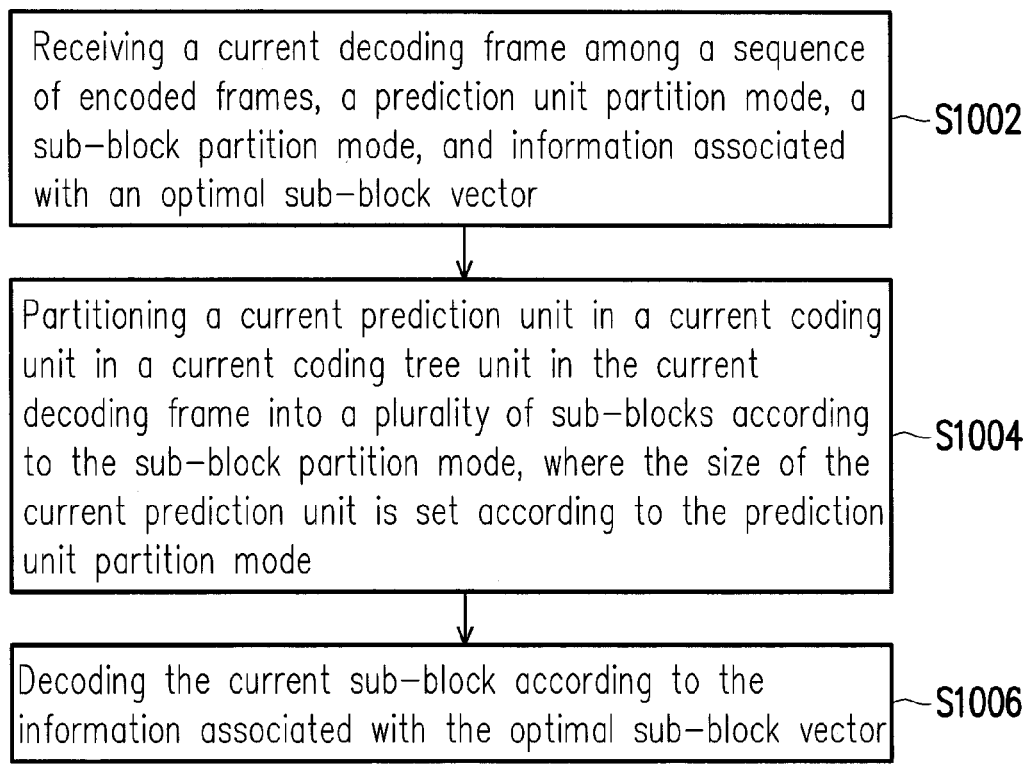
FIG. 10 illustrates a flowchart of a video decoding method according to an embodiment of the invention.

FIG. 10 illustrates a flowchart of a video decoding method according to an embodiment of the invention. Detailed steps of the proposed method in FIG. 10 would be implemented by the components of the video decoder 120 in FIG. 1.

Referring to FIG. 10, the receiving circuit 122 of the video decoder 120 receives a current decoding frame among a sequence of encoded frames, a prediction unit partition mode, a sub-block partition mode, and information associated with an optimal sub-block vector (Step S1002). The sub-block partition mode and the optimal sub-block vector herein are the encoded information in Step S808 of FIG. 8, where the detailed information may refer to the previous paragraphs and would not be repeated hereinafter.

Next, the partition circuit 124 partitions a current prediction unit in a current coding unit in a current coding tree unit in the current decoding frame into a plurality of sub-blocks according to the sub-block partition mode, where the size of the current prediction unit is set according to the prediction unit partition mode (Step S1004). The decoding circuit 128 decodes the current sub-block according to the information associated with the optimal sub-block vector (Step S1006). In other words, the partition circuit 124 may partition the current coding unit according to the prediction unit partition mode and the sub-block partition mode received from the video encoder 110, and the decoding circuit 128 may reconstruct a block vector of the current sub-block according to the optimal sub-block vector predictor and its sub-block vector difference received from the video encoder 110 so as to decode the current sub-block. Moreover, if the receiving circuit 122 receives a residual associated with the current sub-block from the video encoder 110, it may decode the residual after reconstructing the block vector. In the present embodiment, all decoded frames would be output from the video decoder 120 to the player 105 for video playing.

[Third Embodiment]

The third embodiment is an integration of the first embodiment and the second embodiment, and only the difference would be described herein. The partition circuit 114 may perform partition according to a prediction unit partition mode and a sub-block partition mode, where the sub-block partition mode may be categorized into a non-partition, a vertical partition, and a horizontal partition. When the sub-block partition mode is set as the non-partition (i.e. the width and the height of a sub-block would be respectively equal to those of a prediction unit), it would be equivalent to the first embodiment. When the sub-block partition mode is set as the vertical partition, and the horizontal partition, it would be equivalent to the second embodiment.

In summary, the video encoding method and the video decoding method proposed in the invention may adaptively partition a coding unit into two oblong prediction units, and may further partition a prediction unit into a plurality of sub-blocks so as to thereby improve the accuracy for searching out a matching reference block of a prediction unit or a sub-block from a reference frame and enhance video encoding efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A video encoding method, adapted to a video encoder, comprising:

receiving a current encoding frame among a sequence of input frames;

partitioning a current prediction unit in a current coding unit in a current coding tree unit in the current encoding frame into a plurality of sub-blocks according to a sub-block partition mode, wherein the sub-blocks comprises a current sub-block, wherein each of the sub-blocks respectively corresponds to a reference frame among the sequence of input frames, wherein at least one of the reference frames is the current encoding frame, and wherein a size of the current prediction unit is set to one of 2N×2N, 2N×N, 2N×M, 2N×(2N−M), N×2N, M×2N, or (2N−M)×2N according to a prediction unit partition mode, wherein M is an exponent of 2, M<2N, and M≠N, wherein when the sub-block partition mode is a horizontal partition, and when a width of each of the sub-blocks is equal to a width of the current prediction unit, and when one of the width or a height of the sub-blocks is equal to 1, the reference frame corresponding to the current prediction unit is the current encoding frame, wherein when the height of each of the sub-blocks is 1, the size of each of the sub-blocks is one of the followings:

when the size of the current prediction unit is 2N×2N, 2N×N, 2N×M, or 2N×(2N−M), the size of each of the sub-blocks is 2N×1;

when the size of the current prediction unit is N×2N, the size of each of the sub-blocks is N×1;

when the size of the current prediction unit is M×2N, the size of each of the sub-blocks is M×1; and when the size of the current prediction unit is (2N−M)×2N, the size of each of the sub-blocks is (2N−M)×1; and wherein when the height of each of the sub-blocks is L, the size of each of the sub-blocks is one of the followings:

when the size of the current prediction unit is 2N×2N, the size of each of the sub-blocks is 2N×L, wherein $1 < L \leq 2N$;

when the size of the current prediction unit is 2N×N, the size of each of the sub-blocks is 2N×L, wherein $1 < L \leq N$;

when the size of the current prediction unit is 2N×M, the size of each of the sub-blocks is 2N×L, wherein $1 < L \leq M$;

when the size of the current prediction unit is 2N×(2N−M), the size of each of the sub-blocks is 2N×L, wherein $1 < L \leq 2N-M$;

when the size of the current prediction unit is N×2N, the size of each of the sub-blocks is N×L, wherein $1 < L \leq 2N$;

when the size of the current prediction unit is M×2N, the size of each of the sub-blocks is M×L, wherein $1 < L \leq 2N$; and when the size of the current prediction unit is (2N−M)×2N, the size of each of the sub-blocks is (2N−M)×L, wherein $1 < L \leq 2N$;

wherein when the sub-block partition mode is a vertical partition, and when a height of each of the sub-blocks is equal to a height of the current prediction unit, and when one of a width or the height of the sub-blocks is equal to 1, the reference frame corresponding to the current prediction unit is the current encoding frame, wherein when the width of each of the sub-blocks is 1, the size of each of the sub-blocks is one of the followings:

when the size of the current prediction unit is 2N×2N, N×2N, M×2N, or (2N−M)×2N, the size of each of the sub-blocks is 1×2N;

when the size of the current prediction unit is 2N×N, the size of each of the sub-blocks is 1×N;

when the size of the current prediction unit is 2N×M, the size of each of the sub-blocks is 1×M; and when the size of the current prediction unit is 2N×(2N−M), the size of each of the sub-blocks is 1×(2N−M); and wherein when the width of each of the sub-blocks is L and L is an exponent of 2, the size of each of the sub-blocks is one of the followings:

when the size of the current prediction unit is 2N×2N, the size of each of the sub-blocks is L×2N, wherein $1 < L \leq 2N$;

when the size of the current prediction unit is 2N×N, the size of each of the sub-blocks is L×N, wherein $1 < L \leq 2N$;

when the size of the current prediction unit is 2N×M, the size of each of the sub-blocks is L×M, wherein $1 < L \leq 2N$;

when the size of the current prediction unit is 2N×(2N−M), the size of each of the sub-blocks is L×(2N−M), wherein $1 < L \leq 2N$;

when the size of the current prediction unit is N×2N, the size of each of the sub-blocks is L×2N, wherein $1 < L \leq N$;

when the size of the current prediction unit is M×2N, the size of each of the sub-block is L×2N, wherein $1 < L \leq M$; and when the size of the current prediction unit is (2N−M)×2N, the size of each of the sub-blocks is L×2N, wherein $1 < L \leq (2N-M)$;

searching for an optimal reference sub-block of the current sub-block within a search range in the reference frame corresponding to the current sub-block, and obtaining an optimal sub-block vector between the current sub-block and the optimal reference sub-block wherein the optimal block vector is a relative position between the current sub-block and the optimal reference block; and encoding the current sub-block according to the prediction unit partition mode, the sub-block partition mode, and information associated with the optimal sub-block vector in an intra block copy scheme.

2. The video encoding method according to claim 1, wherein the step of searching for the optimal reference sub-block of the current sub-block within the search range in the reference frame corresponding to the current sub-block and obtaining the optimal sub-block vector between the current sub-block and the optimal reference sub-block comprise:

searching for a plurality of candidate reference sub-blocks within the search range, and calculating a cost between each of the candidate reference sub-blocks and the current sub-block wherein each of the costs is a distortion associated with luminance and chroma between the current sub-block and each of the candidate reference sub-blocks in conjunction with a bit rate for encoding a block vector between the current sub-block and each of the candidate reference sub-blocks; and setting the candidate reference sub-blocks corresponding to a minimum cost among the costs as the optimal reference sub-block.

3. The video encoding method according to claim 1, wherein the reference frame is the current encoding frame, and wherein the search range is the current coding tree unit and one or more coding tree units along a horizontal direction of the current coding tree unit.

4. The video encoding method according to claim 1, wherein the reference frame is the current encoding frame, and the approach of searching for the optimal reference sub-block corresponding to the current sub-block is a one-dimensional search or a two-dimensional search, and wherein the one-dimensional search is one of the followings: searching along a horizontal direction from the current sub-block, searching along a vertical direction from the current sub-block, or searching along the horizontal direction and the vertical direction from the current sub-block.

5. The video encoding method according to claim 1, wherein the reference frame is the current encoding frame, and wherein when the current sub-block is a left-most or an upper-most sub-block in the current prediction unit, the step of encoding the current sub-block according to the prediction unit partition mode, the sub-block partition mode, and the information associated with the optimal sub-block vector comprises:

selecting two candidate sub-block vector predictors sequentially from a block vector of a bottom-left block with respect to the current prediction unit, a block vector of an upper-right block with respect to the current prediction unit, and two immediately preceding encoded block vectors;

calculating a block vector difference between each of the candidate sub-block vector predictors and the optimal sub-block vector of the current sub-block, and setting the block vector difference with a minimum encoding bit rate as an optimal sub-block vector predictor; and
encoding the prediction unit partition mode, the optimal block vector predictor, and the block vector difference corresponding to the optimal sub-block vector predictor.

6. The video encoding method according to claim 5, the reference frame is the current encoding frame, and wherein when the current sub-block is neither a left-most nor an upper-most sub-block in the current prediction unit, the step of encoding the current sub-block according to the prediction unit partition mode, the sub-block partition mode, and the information associated with the optimal sub-block vector comprises:
setting information of an optimal sub-block vector corresponding to an immediately preceding encoded sub-block in the current prediction unit as information of the optimal block vector of the current sub-block; and
encoding the prediction unit partition mode, the optimal sub-block vector predictor, and the block vector difference corresponding to the optimal sub-block vector predictor.

7. A video decoding method, adapted to a video decoder, comprising:
receiving a current decoding frame among a sequence of encoded frames, a prediction unit partition mode, a sub-block partition mode, and information associated with an optimal sub-block vector;
partitioning a current prediction unit in a current coding unit in a current coding tree unit in the current decoding frame into a plurality of sub-blocks according to the sub-block partition mode, wherein each of the sub-block respectively corresponds to a reference frame among the sequence of reconstruction frames, wherein a size of the current prediction unit is set to one of 2N×2N, 2N×N, 2N×M, 2N×(2N−M), N×2N, M×2N, or (2N−M)×2N according to the prediction unit partition mode, wherein M is an exponent of 2, M<2N and M≠N, wherein
wherein when the sub-block partition mode is a horizontal partition, and when a width of each of the sub-blocks is equal to a width of the current prediction unit, and when one of the width or a height of the sub-blocks is equal to 1, the reference frame corresponding to the current prediction unit is the current encoding frame,
wherein when the height of each of the sub-blocks is 1, the size of each of the sub-blocks is one of the followings:
when the size of the current prediction unit is 2N×2N, 2N×N, 2N×M, or 2N×(2N−M), the size of each of the sub-blocks is 2N×1;
when the size of the current prediction unit is N×2N, the size of each of the sub-blocks is N×1;
when the size of the current prediction unit is M×2N, the size of each of the sub-blocks is M×1; and
when the size of the current prediction unit is (2N−M)×2N, the size of each of the sub-blocks is (2N−M)×1; and
wherein when the height of each of the sub-blocks is L, the size of each of the sub-blocks is one of the followings:
when the size of the current prediction unit is 2N×2N, the size of each of the sub-blocks is 2N×L, wherein 1<L≤2N;
when the size of the current prediction unit is 2N×N, the size of each of the sub-blocks is 2N×L, wherein 1<L≤N;
when the size of the current prediction unit is 2N×M, the size of each of the sub-blocks is 2N×L, wherein 1<L≤M;
when the size of the current prediction unit is 2N×(2N−M), the size of each of the sub-blocks is 2N×L, wherein 1<L≤2N−M;
when the size of the current prediction unit is N×2N, the size of each of the sub-blocks is N×L, wherein 1<L≤2N;
when the size of the current prediction unit is M×2N, the size of each of the sub-blocks is M×L, wherein 1<L≤2N; and
when the size of the current prediction unit is (2N−M)×2N, the size of each of the sub-blocks is (2N−M)×L, wherein 1<L≤2N;
wherein when the sub-block partition mode is a vertical partition, and when a height of each of the sub-blocks is equal to a height of the current prediction unit, and when one of a width or the height of the sub-blocks is equal to 1, the reference frame corresponding to the current prediction unit is the current encoding frame,
wherein when the width of each of the sub-blocks is 1, the size of each of the sub-blocks is one of the followings:
when the size of the current prediction unit is 2N×2N, N×2N, M×2N, or (2N−M)×2N, the size of each of the sub-blocks is 1×2N;
when the size of the current prediction unit is 2N×N, the size of each of the sub-blocks is 1×N;
when the size of the current prediction unit is 2N×M, the size of each of the sub-blocks is 1×M; and
when the size of the current prediction unit is 2N×(2N−M), the size of each of the sub-blocks is 1×(2N−M); and
wherein when the width of each of the sub-blocks is L and L is an exponent of 2, the size of each of the sub-blocks is one of the followings:
when the size of the current prediction unit is 2N×2N, the size of each of the sub-blocks is L×2N, wherein 1<L≤2N;
when the size of the current prediction unit is 2N×N, the size of each of the sub-blocks is L×N, wherein 1<L≤2N;
when the size of the current prediction unit is 2N×M, the size of each of the sub-blocks is L×M, wherein 1<L≤2N;
when the size of the current prediction unit is 2N×(2N−M), the size of each of the sub-blocks is L×(2N−M), wherein 1<L≤2N;
when the size of the current prediction unit is N×2N, the size of each of the sub-blocks is L×2N, wherein 1<L≤N;
when the size of the current prediction unit is M×2N, the size of each of the sub-blocks is L×2N, wherein 1<L≤M; and
when the size of the current prediction unit is (2N−M)×2N, the size of each of the sub-blocks is L×2N, wherein 1<L≤(2N−M); and decoding the current sub-block according to the information associated with the optimal sub-block vector in an intra block copy scheme, wherein the optimal sub-block vector is a relative position between the current sub-block and the optimal reference sub-block.

* * * * *